United States Patent [19]

George et al.

[11] Patent Number: 4,996,690
[45] Date of Patent: Feb. 26, 1991

[54] WRITE OPERATION WITH GATING CAPABILITY

[75] Inventors: Glen A. George, Pasadena; Douglas L. Whiting, S. Pasadena, both of Calif.

[73] Assignee: STAC Electronics, Carlsbad, Calif.

[21] Appl. No.: 237,394

[22] Filed: Aug. 26, 1988

[51] Int. Cl.⁵ ............................................. G06F 11/10
[52] U.S. Cl. .................. 371/37.1; 371/40.1
[58] Field of Search ............... 371/37.2, 37.1, 37.3, 371/37.4, 37.6, 37.5, 37.7, 38.1, 40.1, 40.2, 40.3

[56] References Cited

U.S. PATENT DOCUMENTS

| | | | |
|---|---|---|---|
| 4,712,215 | 12/1987 | Joshi | 371/37.1 |
| 4,715,036 | 12/1987 | Oakes | 371/37.1 |
| 4,720,830 | 1/1988 | Joshi | 371/37.1 |
| 4,811,361 | 3/1989 | Bacou | 371/37.1 |
| 4,827,477 | 5/1989 | Avaneas | 371/37.1 |
| 4,835,775 | 5/1989 | Seroussi | 371/37.1 |

*Primary Examiner*—Michael R. Fleming
*Attorney, Agent, or Firm*—Irell & Manella

[57] ABSTRACT

An apparatus and/or method for generating parity digits of digital information (data) in a digital communication system is disclosed. The communication system (8) is for transferring a plurality of data intervals from an originating data source (12) to a data sink (13). Each data interval comprises one or more blocks of data and each block contains one or more bytes of data. The communication system (8) includes a temporary storage means (24) for holding the data for a limited period. Included are means for transferring (14, 40) one or more data intervals from the data source (12) to the temporary storage means (24) and means for transferring (22, 40) one of the data intervals from the temporary storage means (24) to the data sink (13) including means for calculating (72) error correcting code words associated with each data interval and means for storing (16) the error correcting code words for further processing. A gating means (18, 64) is provided for halting further transfer of the data intervals between the temporary storage means (24) and the data sink (13). The gating means (18, 64) further includes means for sending the stored code words from the means for storing (16) to the data sink (13).

18 Claims, 17 Drawing Sheets

GF(4) FIG.8(A).

| +XOR | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

FIG.8(B).

| X | 0 | 1 | 2 | 3 |
|---|---|---|---|---|
| 0 | 0 | 0 | 0 | 0 |
| 1 | 0 | 1 | 2 | 3 |
| 2 | 0 | 2 | 3 | 1 |
| 3 | 0 | 3 | 1 | 2 |

FIG. 9(A).

$$\begin{array}{r}
\phantom{X^2+2X+3\,\overline{\big)}}\;\underbrace{(2X^4) + 0X^3 + X^2 + 3X + 3}_{180}\phantom{000}\\
X^2+2X+3\,\overline{\big)\;2X^6+3X^5+0X^4+1X^3+1X^2+3X+2}\\
\underline{2X^6+3X^5+1X^4}\phantom{0000000000000000000}\\
\boxed{0X^5+1X^4}+1X^3\phantom{0000000000000}\\
\underline{0X^5+0X^4+0X^3}\phantom{0000000000000}\\
1X^4+1X^3+1X^2\phantom{00000000}\\
\underline{1X^4+2X^3+3X^2}\phantom{00000000}\\
\boxed{3X^3+2X^2}+3X\phantom{000}\\
\underline{3X^3+1X^2+2X}\phantom{000}\\
3X^2+1X+2\\
\underline{3X^2+1X+2}\\
0
\end{array}$$

Labels: 178, 186, 180, 176, 182, 184 (GENERATOR POLYNOMIAL: $X^2+2X+3$), 188, 195

FIG. 9(B).

$$0X^6 + 0X^5 + 0X^4 + 0X^3 + 0X^2 + 0X + 0 \quad \text{QUOTIENT}$$

$$+ 2X^6 \quad \text{FEEDBACK}$$

$$\overline{2X^6 + 0X^5 + 0X^4} \qquad \overline{2X^4}_{204}$$

$$2X^6 + 3X^5 + 1X^4$$

$$18 \underbrace{\overline{(3X^5) + (1X^4)}}_{3X^5} 18$$

$$\overline{0X^5 + 1X^4 + 0X^3} \qquad 0X^3_{206}$$

$$0X^5 + 0X^4 + 0X^3$$

$$190 \underbrace{\overline{(1X^4) + (0X^3)}}_{0X^4} 192$$

$$\overline{1X^4 + 0X^3 + 0X^2} \qquad 1X^2_{208}$$

$$1X^4 + 2X^3 + 3X^2$$

$$193 \underbrace{\overline{(2X^3) + (3X^2)}}_{1X^3} 194$$

$$\overline{3X^3 + 3X^2 + 0X} \qquad 3X_{210}$$

$$3X^3 + 1X^2 + 2X$$

$$196 \underbrace{\overline{(2X^2) + (2X)}}_{1X^2} 198 \quad 3_{212}$$

$$200 \underbrace{\overline{(3X^2) + (2X) + 0}}_{3X^2 + 3X + 2} 202$$

$$\overline{X + 2}$$

FIG. 9(C).

| | | DATA |
|---|---|---|
| 215 — SYNC | HEADER | 2 |
| 217 — SYNC | HEADER | 3 |
| 219 — SYNC | HEADER | 0 |
| 221 — SYNC | HEADER | 1 |
| 223 — SYNC | HEADER | 1 |

| SYNC HEADER | 2 |
| SYNC HEADER | 3 |
| SYNC HEADER | 0 |
| SYNC HEADER | 1 |
| SYNC HEADER | 1 |
| SYNC HEADER | 3 |
| SYNC HEADER | 2 |

229

225

REED SOLOMON CODE WORD

FIG. 10(A).

| | DATA(b)=PARITY(DATA,i) | FEEDBACK (FDBK) | j | g(1) g(r-j)(PARBLK+j-1,i) | P(0,i) PARITY | g(0) g(r-j)(PARBLK+j-1,i) | P(1,i) PARITY |
|---|---|---|---|---|---|---|---|
| 214 | 2 | | | | | | |
| 216 | 2 | 2 | | | | | |
| 218 | 2 | 2 | 1 | | | | |
| 220 | 2 | 2 | 1 | 2 | | | |
| 222 | 2 | 2 | 1 | 2 | 3 | | |
| 224 | 2 | 2 | 2 | 2 | 3 | | |
| 226 | 2 | 2 | 2 | 2 | 3 | 3 | |
| 228 | 2 | 2 | 2 | 2 | 3 | 3 | 1 |
| 230 | 3 | | | | | | |
| 232 | 3 | 0 | | | | | |
| 234 | 3 | 0 | 1 | | | | |
| 236 | 3 | 0 | 1 | 2 | | | |
| 238 | 3 | 0 | 1 | 2 | 1 | | |
| 240 | 3 | 0 | 2 | 2 | 1 | | |
| 242 | 2 | 0 | 2 | 2 | 1 | 3 | |
| 244 | 2 | 0 | 2 | 2 | 1 | 3 | 0 |
| 246 | 0 | | | | | | |
| 248 | 0 | 1 | | | | | |
| 250 | 0 | 1 | 1 | | | | |
| 252 | 0 | 1 | 1 | 2 | | | |
| 254 | 0 | 1 | 1 | 2 | 2 | | |
| 256 | 0 | 1 | 2 | 2 | 2 | | |

FIG.10(B).

| | DATA(b)= PARITY (DATA,i) | FEEDBACK (FDBK) | j | g(1) q(r-j) | p(0,i) PARITY (PARBLK+j-1,i) | g(0) q(r-j) | p(1,i) PARITY (PARBLK+j-1,i) |
|---|---|---|---|---|---|---|---|
| 258 | 0 | 1 | 2 | 2 | 2 | 3 | |
| 260 | 0 | 1 | 2 | 2 | 2 | 3 | 3 |
| 262 | 1 | | | | | | |
| 264 | 1 | 3 | | | | | |
| 266 | 1 | 3 | 1 | | | | |
| 268 | 1 | 3 | 1 | 2 | | | |
| 270 | 1 | 3 | 1 | 2 | 2 | | |
| 272 | 1 | 3 | 2 | 2 | 2 | | |
| 274 | 1 | 3 | 2 | 2 | 2 | 3 | |
| 276 | 1 | 3 | 2 | 2 | 2 | 3 | 2 |
| 278 | 1 | | | | | | |
| 280 | 1 | 3 | | | | | |
| 282 | 1 | 3 | 1 | | | | |
| 284 | 1 | 3 | 1 | 2 | | | |
| 286 | 1 | 3 | 1 | 2 | 3 | | |
| 288 | 1 | 3 | 2 | 2 | 3 | | |

FIG.10(C).

| | DATA(b)= PARITY (DATA,i) | FEEDBACK (FDBK) | j | g(1) q(r-j) | p(0,i) PARITY (PARBLK+j-1,i) | g(0) q(r-j) | p(1,i) PARITY (PARBLK+j-1,i) |
|---|---|---|---|---|---|---|---|
| 290 | 1 | 3 | 2 | 2 | 3 | 3 | |
| 292 | 1 | 3 | 2 | 2 | 3 | 3 | 2 |

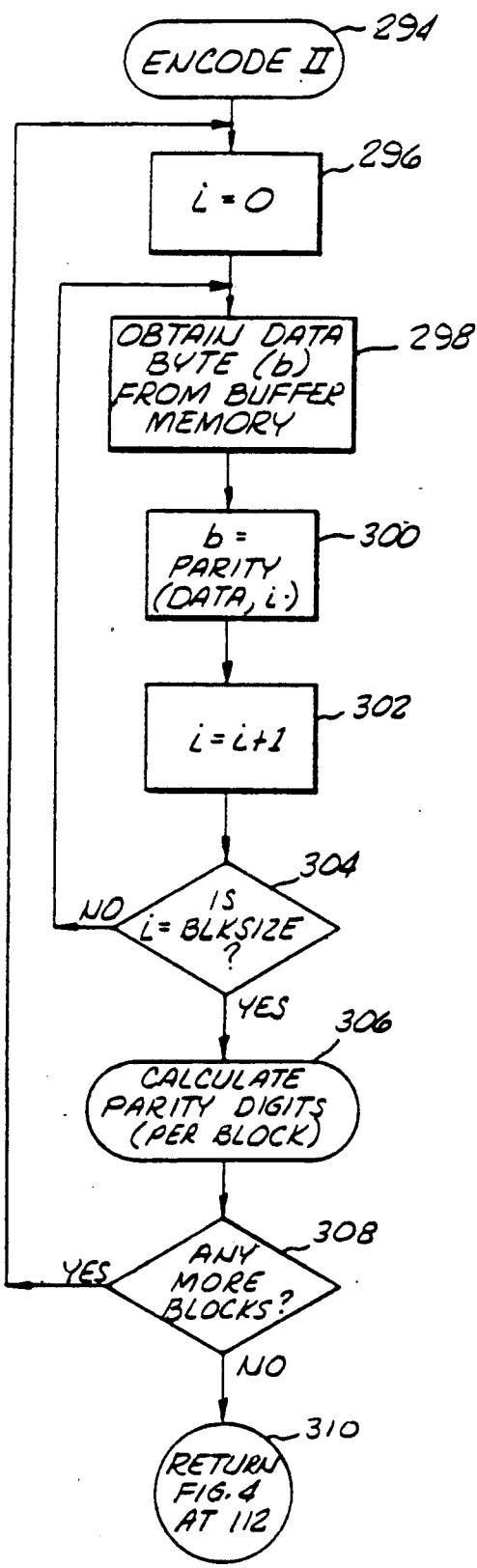

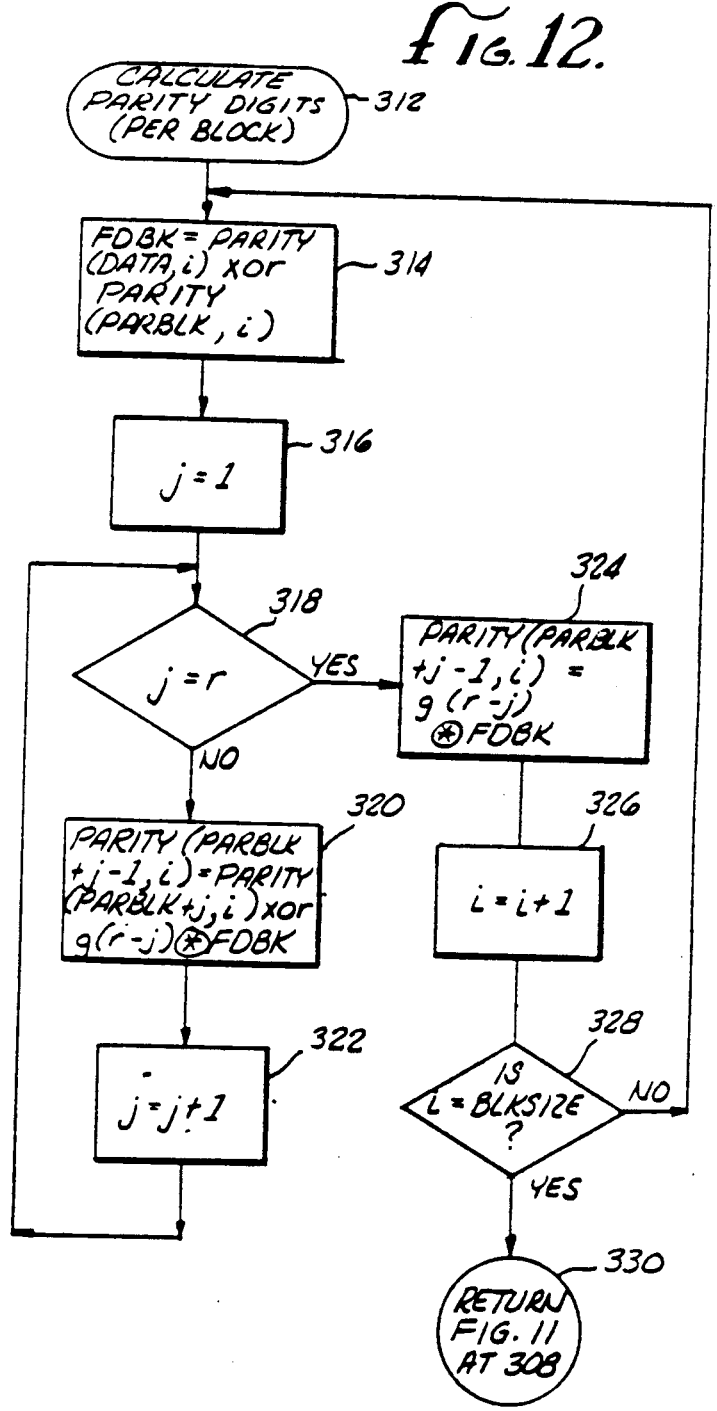

WRITE OPERATION WITH GATING CAPABILITY

FIELD OF THE INVENTION

The present invention relates to a method and apparatus for generating check or parity digits of digital information (data) occurring during communication of the data to a storage tape medium. Communication includes transmission over conductors, telephone lines, radio, television broadcasting and the like.

BACKGROUND OF THE INVENTION

Error correction is implemented most commonly in digital communication through an encoding apparatus for developing redundant information in a mathematically prescribed manner for transmission over data channels to eventual transmission to an error correction decoder which detects, locates and corrects combinations of errors in the information stream. The purpose for the redundant information is to correct errors caused by defects in recording tape media which create areas where digital data is not recorded properly or cannot be reliably read back.

During recording, read back and transmission of data, errors occur in digital data with some finite probability. The errors which occur are considered to be of two types, although there is undoubtedly some overlap between the two. The first type is a single bit error which is a substitution of one of two possible values of a binary bit for its opposite value. Such errors usually occur randomly in a digital signal. The second type of error consists of a continuous sequence of erroneous bits. Such errors are referred to as "burst errors". The length of these bursts and their frequency of occurrence is also random.

A typical approach to the inevitable occurrence of such errors in a digital signal is to include additional or redundant bits in the signal which allow for detection and correction of such errors. The process whereby the redundant bits are added to information is called encoding; the information bits plus redundant bits form the code word.

The cost associated with encoding is increased time for processing the data after transmission, the extra equipment needed and the decrease in the amount of information which can be transmitted per unit of time because of the extra bits which are included for error detection and correction. As the number of errors which can be corrected by any code increases, the number of bits which must be added to the data to enable such corrections also increases. Accordingly, there has been considerable effort directed to finding efficient methods for generating and coordinating the creation of these extra redundant bits. Efficiency in this context is measured by the ratio of information or data bits to data bits plus data correction or "parity" bits; it is also measured by the number of errors which can be corrected over a given amount of data (typically expressed as the number of errors remaining after correction of an assumed initial error frequency occurs). From a theoretical view point it has been found that Reed-Solomon class of block codes are among the most efficient coding schemes devised. For a more complete development of the Reed-Solomon codes, refer to McEliece, "The Theory of Information and Coding", Addison-Wesley Publishing Company (1977), which is herein incorporated by reference.

Efficiency of any error correcting code however, in practical use, depends on the implementing equipment. Tape drives cannot stop in mid stream, so a method must be provided for reliably fast response and high overall transfer rates. For tape drives with low average data transfer rates, there are sometimes requirements for very short "latency" time, the time from initial requests to actual movement of data. For example, a short latency time is required to avoid data "under-run" situations, processing at a speed slower than the tape drive can accept the data. In order to match the data throughput to the tape acceptance rate, the tape must be stopped and backed up to the location where the under-run situation begins. This process significantly effects the overall performance of the tape drive. To maximize the efficiency of the data transfer rate, the tape drive must be kept "streaming".

Compounding the problem of data under-run, parity digits for error detection and correction must be calculated which may also cause streaming to halt. More particularly, in a typical process for calculating parity digits and/or appending the digits to the data, a two-step process must occur. First, the data is sent out to the tape drive and then after the data has been stored on tape the parity digits are calculated and sent to tape. This operation takes time away from the constant transfer of data to the tape drive. A significant performance degradation occurs because the tape stops streaming to await the calculation and arrival of the parity digits.

SUMMARY OF THE INVENTION

The present invention seeks to provide a method and apparatus for maximizing the overall performance of data transfer from a data source to a data sink (preferably a tape drive) including the calculation of parity digits associated with the transferred data.

Briefly, a preferred embodiment of the invention includes an apparatus and method for generating parity digits of digital information (data) in a digital communication system. The communication system is used for transferring a plurality of data intervals from an originating data source to a data sink. Each data interval contains one or more blocks of data and each block contains one or more bytes of data. The communication system includes a data transfer bus for transferring the data intervals and also a temporary storage means for holding the data for a limited period.

Preferably, transfer of the data and calculation of parity digits associated with the data occurs in five steps. First, one or more of the data intervals is transferred from the data source over the data transfer bus to the temporary storage means where the data intervals are stored. Second, one of the stored data intervals is transferred from the temporary storage means to the data sink over the data transfer bus. Third, the step of transferring the data interval to the data sink also includes the steps of calculating the parity digits associated with the data interval and storing the parity digits for further processing. Fourth, gating the data transfer bus from the temporary storage means to the data sink to halt further transfer of data intervals. Lastly, the step of gating, further including the step of sending the stored parity digits over the data transfer bus to the data sink.

In the preferred embodiment, the data interval contains one or more columns and each column contains one or more data bytes, each being from a different block of the data interval. The data column and the associated parity digits form a code word.

Calculation of the parity digits can occur by one of three methods. The first method calculates intermediate results of parity digits after each byte of data is transferred to the data sink. The second method calculates one or more intermediate result parity digits after each block of data is transferred to the data sink. The third method encodes parity digits after an entire data interval is transferred to the data sink. The first method calculates parity digits on an ongoing basis whereas, the second and third methods calculate parity digits after a particular segment of data is processed; a block of data by the second method and a data interval by the third method.

BRIEF DESCRIPTION OF THE DRAWINGS

FIG. 8(A) is a table representing the finite field GF(4) for the addition operation;

FIG. 8(B) is a table representing the finite field GF(4) multiplication operation;

FIG. 9(A) represents a finite field "long hand" polynomial division of a data polynomial divided by a generator polynomial;

FIG. 9(B) represents an alternate method for dividing a data polynomial by a generator polynomial on a per byte basis;

FIG. 9(C) represents an example of an interval of data where each block contains only one byte of data;

FIG. 9(D) represents output from the tape formatter including the data interval and parity digits associated therewith;

FIGS. 10(A), (B) and (C) are tables depicting intermediate results generated by of the parity digit generator (FIG. 2) controlled by the GENERATE ECC method of FIG. 4 generating the parity digits associated with the data interval of FIG. 9(C);

FIG. 11 is a flow block diagram which depicts the sequence of operations performed by the components of the parity digit generator (FIG. 2) for encoding a data block interval under control of the ENCODE PARITY DIGIT method II referenced in FIG. 4;

FIG. 12 is a flow diagram which depicts the sequence of operations performed by the encoder of the parity digit generator (FIG. 2) for calculating parity digits on a per block basis under control of the CALCULATE PARITY DIGITS (PER BLOCK) method referenced in FIG. 11;

DETAILED DESCRIPTION OF THE INVENTION

Table of Contents

I. Introduction
II. An Overview of the Write Operation
III. Detailed Description of the Parity Digit Generator
IV. GENERATE ECC Method
   A. Encode Parity Digits Method I
   B. Output Parity Digits Method
V. Detailed Example of the GENERATE ECC Method
VI. Additional Embodiments for Encoding Parity Digits
   A. Encode Parity Digits Method II
   B. Encode Parity Digits Method III

I. Introduction

Figure 1:
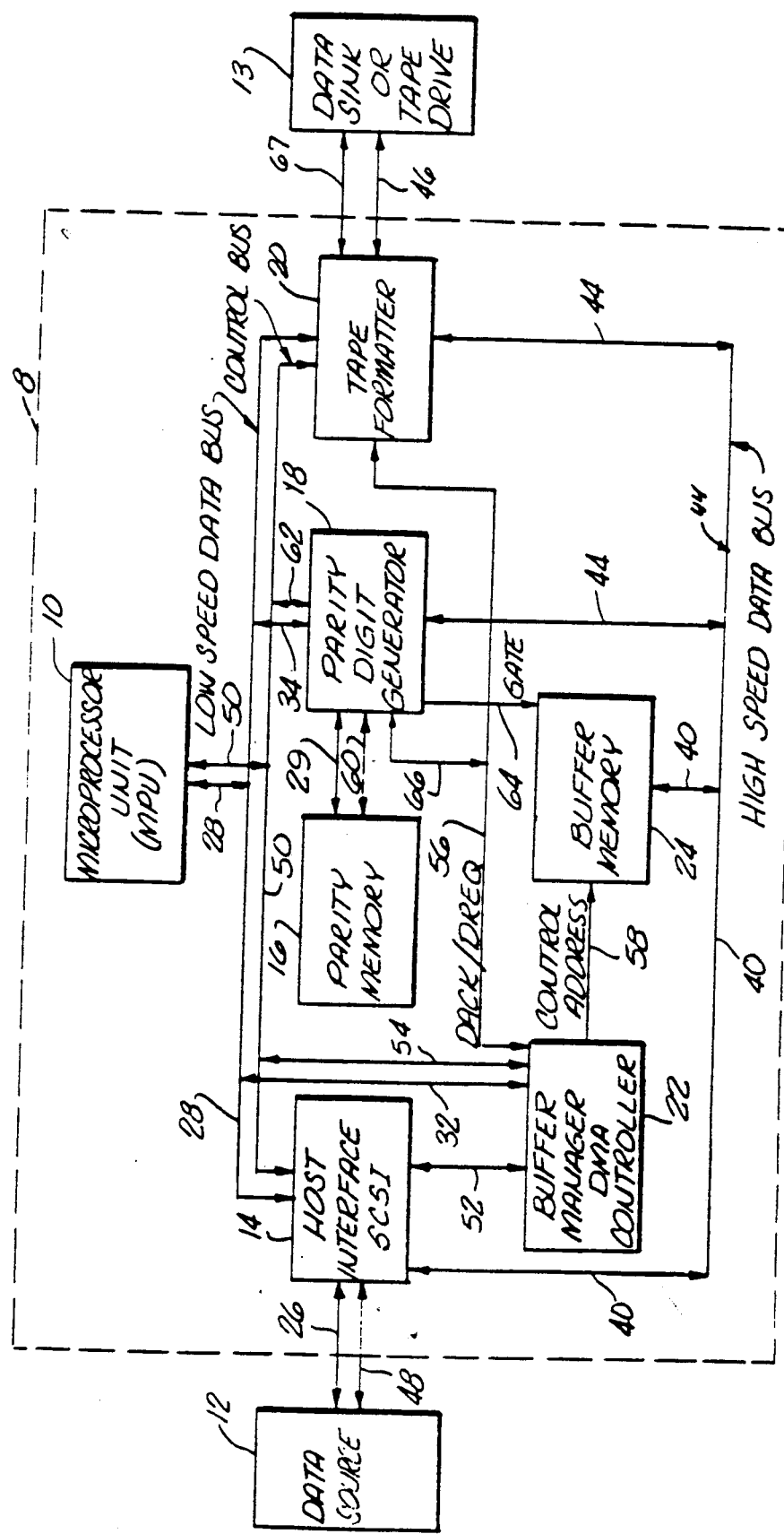
FIG. 1 is a schematic block diagram of a communication system for transferring data from a data source to a data sink in accordance with the present invention.

FIG. 1 depicts a schematic block diagram of a communication system 8 for transferring data from an originating data source 12 to a data sink 13 and for generating Error Correcting Code (ECC) of the transferred data. The communication system 8 is typically housed in a series of chips 10, 14, 16, 18, 20, 22, 24; each block in the schematic block diagram representing a different chip. In addition, each block logically represents a conventional subsystem for performing a particular set of tasks which may be combined into other blocks to form larger subsystems. In fact, the entire communication system 8 may be logically represented in a single block or on a single integrated chip. However, for purposes of more completely describing the preferred embodiment, each subsystem has been separated into a different block. The operation of each subsystem may be performed by software on board the chip or alternatively by hardwired logic arrays design into the chip.

The communication system 8, as shown in FIG. 1, typically consists of a microprocessing unit (MPU) 10, a host interface system 14 (e.g., SCSI), a parity digit generator 18, a parity memory 16, a tape formatter 20, a buffer manager 22 (e.g., DMA Controller) and a buffer memory 24. A series of data buses 26, 28, 29, 32, 34, 40, 44, and 46 connect the data flow from the data source to the data sink and the various components of the communication system 8 to one another. Control signals for coordinating the activity of the various components are sent over control buses 48, 50, 52, 54, 56, 58, 60, 62, 64, 66, and 67.

The communication system 8 is located in between the source of data 12 (i.e., mainframe computer, personal computer, communications line such as telephone or radio, etc.) and the data sink 13 (i.e. tape drive, disk drive, etc.), which in the preferred embodiment is a cartridge tape drive system. Communication between the data source and the communication system 8 occurs over data line 26 and control line 48. A host interface system 14 coordinates all "hand-shaking" between the data source 12 and the communications system 8. The host interface 14 may have a small buffer memory (not shown) to store incoming data temporarily before the data is output to high speed data bus 40, 44. The small buffer memory in the host interface 14 accounts for any discrepancy in the rate at which the data bus 40, 44 can accept data and the rate at which the host interface 14 can output the data. An example of a typical host interface system 14 is discussed in an article by Steve Garcia entitled "Ading SCSI to the SB180 Computer," Byte magazine (5/86 p. 85–94, 6/86 pp. 107–114), which is herein incorporated by reference. Data bus 40, 44 is a high speed bidirectional data bus. Moreover, the data bus enables data to go only one way at a time.

The overall operation of the communication system 8 is coordinated by the microprocessor unit 10. Typically, the microprocessor unit 10 is either an Intel 8086, 8088, 8051 or Zilog Z80. Status data from the various components of the communication system 8 is received by the microprocessor unit 10 over low speed data lines 28, 32 and 34. Microprocessor unit 10 asserts control over the components of the communication system 8 via control lines 50, 54 and 62.

Buffer manager 22 coordinates the flow of data over the high speed bus 40 into buffer memory 24. Microprocessor unit 10 controls the buffer manager 22 by sending control instructions over control bus 54. The buffer manager 22 carries out a series of instructions provided by the microprocessor unit 10 to coordinate the placement of data into the buffer memory 24. For a more complete discussion on a typical buffer manager 22 refer to the data sheet for the AIC-300F Dual-Port Buffer Controller (June 1987) by Adaptee Inc., which is herein incorporated by reference.

Buffer memory 24 is a dynamic or static random access memory. For a more detailed discussion regarding dynamic and static random access memories, refer to IC Memory Data Book, Hitachi America Ltd. (1986) (See 4-bit DRAM-HM 50464, STRAM-HM 62256), which is herein incorporated by reference. Buffer memory 24 typically contains a pin designated as "G" for gate or "OE" for output enable. The purpose of this pin is to accept control signals which cause the buffer memory 24 to halt all or outputting operation. The gate is attached to the parity digit generator 18 via control bus 64.

The purpose of the parity digit generator 18 is for generating ECC parity digits or check digits. The parity digit generator 18 monitors the high speed data bus 44 and control line (DACK/DREQ) 56 between the buffer manager 22 and the tape formatter 20. Data that passes over the high speed data bus 44 is simultaneously sent to the parity digit generator 18 over data bus 36. Parity digits are calculated by the parity digit generator 18 (more fully described in section III), transferred over data bus 29 and stored in the parity memory 16 for future processing. The parity digit generator 18 also controls the placement of the calculated parity digits within the parity memory 16.

Figure 3:
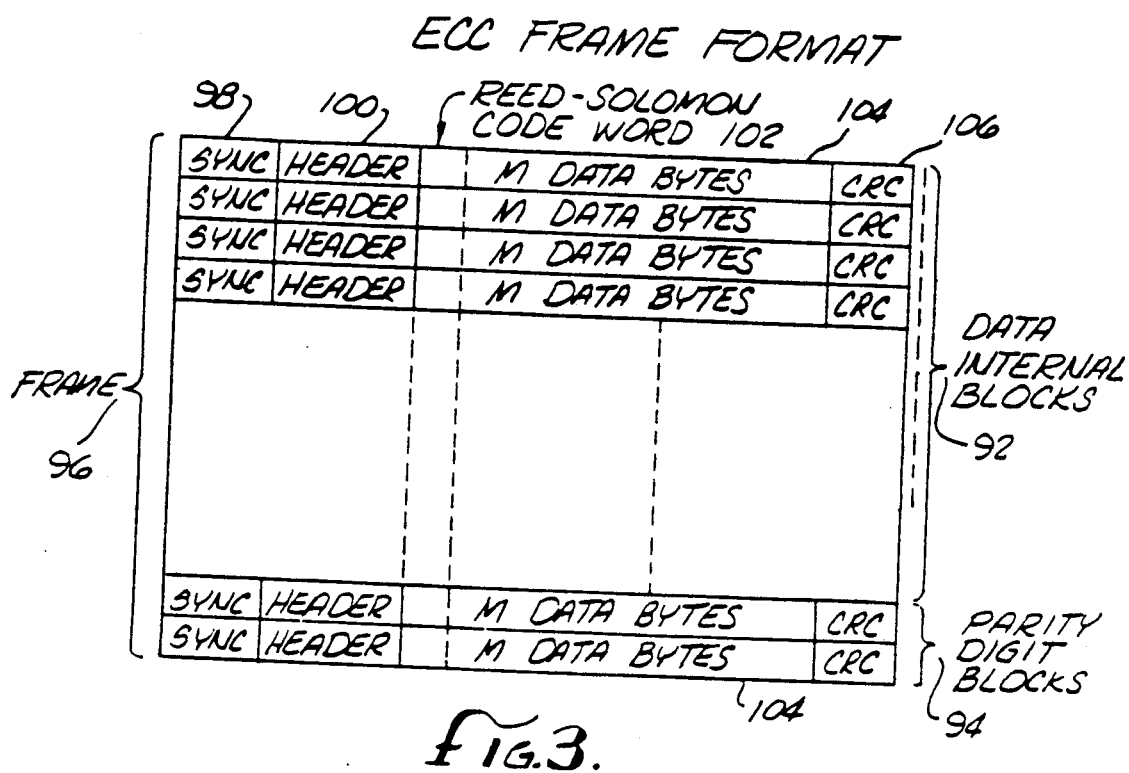
FIG. 3 is an example of an ECC frame format generated by the tape formatter.

Tape formatter 20 establishes the physical layout of the data presented to the data sink 13. For a more detailed discussion regarding a typical tape formatter 20, refer to Product Specification- ADS-4360 (1985) by Adaptive Data System, Inc. which is herein incorporated by reference. In the preferred embodiment, the tape formatter 20 formats the data as shown in FIG. 3. A typical ECC frame format is the QIC 112, and the industry data sheet for the QIC 112 is herein incorporated by reference. The formatted data is sent over data bus 46 to the data sink which in the preferred embodiment is a tape drive system.

II. An Overview of the Write Operation

In a typical "write" or recording to tape operation, the data source 12 will be ready to send data to the data sink 13; however, ECC must be generated and provided with the data to the data sink 13. Thus, the communication system 8 is provided for coordinating the transfer of the data from the data source 12 to the data sink 13 and providing the necessary ECC for maintaining the reliability of the data. Before the communication system 8 obtains the data from the data source 12, the microprocessor unit 10 initializes each of the components 14, 18, 20 and 22 attached to the control line 50. The microprocessor unit 10 then sends a control signal over line 50 to the host interface 14 informing it that data is ready to be sent over data line 26. The host interface 14 then informs the buffer manager 22, by control line 52, that data is ready to be processed over the high speed bus 40 to the buffer memory 24. The microprocessor unit 10 sends a control signal to gate the host interface 14 and the buffer memory 24 to the high speed data bus 40. The microprocessor unit 10, over data bus 32, monitors the activity of the buffer manager 22 to determine when data has been transferred to the buffer memory 24. When the microprocessor unit 10 determines that data has been transferred to the buffer memory 24, it provides a control signal to the tape formatter 20 over the control line 56, informing the tape formatter 20 that a transfer of data over the high speed bus will shortly occur. The DMA controller 22 then arbitrates, gating the buffer memory 24 to the tape formatter 20 via high speed bus 44.

In the preferred embodiment of the invention, the high speed bus 40, 44 can process data at a faster rate than the conventional tape formatter 20 can process the data. Because the tape formatter 20 cannot process the entire band width of data, only a portion of the band width of the bus is required. In this way, parallel data transfer can occur from the host interface 14 over unused band width of the high speed bus 40, 44 to the buffer memory 24. By continuing the stream of data transfer from the host interface 14 to the buffer memory 24, the buffer memory 24 always maintains more data than the tape formatter 20 requires. Additionally, due to areas of the tape which may not require data, there may be periods during which the high speed bus 40 can be solely dedicated to the transfer of data between the host interface 14 and the buffer memory 24, further ensuring a backlog of data in buffer memory 24.

As data is transferred over high speed bus 40, 44 from buffer memory 24 to tape formatter 20, parity digit generator 18 also receives the data over data bus 44 and monitors the data generating parity digits. As the parity digits are generated they are sent over data bus 29 and stored in parity memory 16 for future processing. Meanwhile, microprocessor unit 10 counts the number of blocks of data which are sent to the tape formatter 20. In the preferred embodiment, microprocessor unit 10 counts one interval of data, or N blocks. Each block contains M bytes of data. When an interval of data is processed, the microprocessor unit 10 alerts the parity digit generator 18 over control lines 50 and 62 to prepare for the transfer of the calculated and stored parity digits over the high speed bus 44. When tape formatter 20 requests the next block from buffer manager 22, parity digit generator 18 also receives the request signal (DREQ) over control line 66. Then buffer manager 22 sends an instruction to buffer memory 24, instructing the buffer memory 24 to send the next block of data to the tape formatter 20. An acknowledgement signal (DACK) is also sent over the control line 56 to the tape formatter 20 informing the tape formatter 20 that a block of data from the buffer memory 24 is on the way. Simultaneously, the parity digit generator 18 receives the acknowledge signal (DACK) over control line 66 and sends a "gate off" control signal over control line 64 to the buffer memory 24. The "gate off" signal effectively halts the output operation of the buffer memory 24 precluding transfer of any data blocks from the buffer memory. The parity digit generator 18 then transfers a block of parity digits stored in the parity memory 16 over the data bus 29 to the high speed data bus 44.

As a result of this operation, the tape formatter 20 believes that it is getting a block of data from the buffer memory 24; however, instead the block it receives contains parity digits from the parity memory 16. The tape formatter 20 outputs a resulting parity digit block in the same format that it sent the previous data blocks to the data sink 13. Depending upon the level of redundancy of the system, more than one parity block may be required for a data interval. Additional parity blocks are sent during the next data block requests from the tape formatter 20. When the parity digit blocks for a particular data interval have been added to the data blocks, a single "frame" has been generated. A frame of data contains one data interval and its associated parity digits. This process continues until all of the data intervals which are output from the data source 12 are processed by the communication system 8.

In the preferred embodiment, the tape formatter 20 (FIG. 1) generates data to the data sink 13 in the format shown in FIG. 3. A data interval 92 consists of N blocks which comprise M bytes of data 104. The data interval is followed by a series of parity blocks 94 which also contain M data bytes 104. Typically, there are "r" redundancy parity blocks 94 following a data interval. Redundancy indicates the level of error correction capability. In the preferred embodiment, there are typically 1 to 4 parity digit blocks which can follow a data interval of 1 to 253 data blocks. The total number of blocks of the frame 96 is equal to N+r blocks. Each block in the ECC format is broken up into four separate fields; a sync field 98, header field 100, data byte field 104 and CRC field 106. The sync field 98 is a synchronization field which alerts the system that a new block of data is about to begin. The header field 100 is an address field which is usually the number of the block or some other form of address. Field 104 is a data field which consists of M bytes of data. In the preferred embodiment, M is equal to 1024 bytes. The CRC field is a cyclic redundancy check (CRC) byte which is formulated by the tape formatter 20. The CRC is a second form of parity digit or check digit which is beyond the scope of this patent application, however, its purpose is to enable the system to determine whether there are any errors occurring within a particular block. For a more detailed discussion regarding the generation and use of CRC refer to Neal Glover, Practical Error Correction Design for Engineers, Data Systems Technology, Corp. (1982) pp. 54–61, which is herein incorporated by reference.

Although the CRC is useful for identifying errors, it is not very helpful for correcting errors. The CRC identifies errors logically in the horizontal direction. Whereas, the ECC code word 102 (a column of data plus parity digits), identifies errors which occur in the vertical direction. An ECC code word comprises a single byte of data from each block in the data interval 92 and a parity digit byte from each parity digit blocks 94. In the preferred embodiment, ECC code words are Reed-Solomon code words and CRC have been chosen to allow maximum correction capability of the data blocks within the frame should any errors occur. In the preferred embodiment, the parity digit generator 18 is programmable to accept a varying range for the parameters M, N, and r.

III. Detailed Description of the Parity Digit Generator

Figure 2:
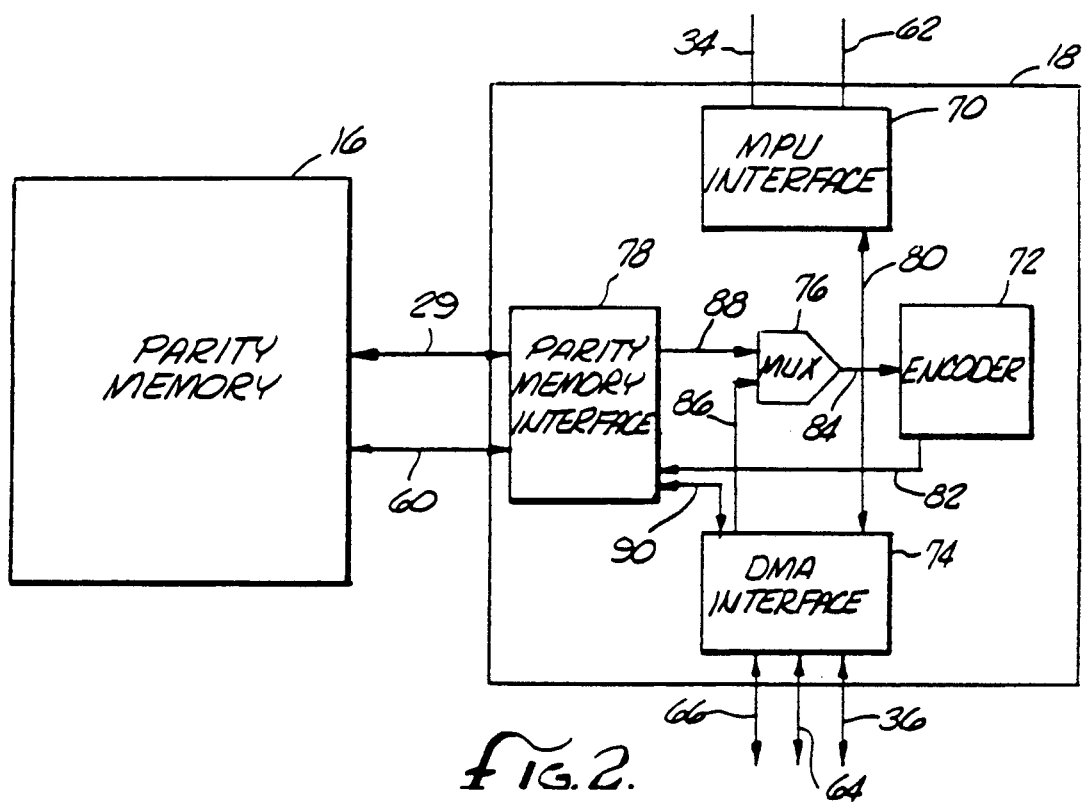
FIG. 2 depicts a schematic block diagram of the parity digit generator and the parity memory for encoding and storing parity digits respectively, in accordance with the present invention.

Referring to FIG. 2, a schematic block diagram of the parity digit generator 18 is shown.

The parity digit generator 18 consists of five components; an MPU interface 70, a parity memory interface 78, a DMA interface 74, an encoder 72 and a multiplexer 76. Each of the components is connected by various data lines 80, 82, 84, 86, 88, and 90. The DMA interface 74 coordinates all "handshaking" with the high speed bus 44 (FIG. 1), buffer memory 24 (FIG. 1) and control line 56 (FIG. 1).

Parity memory interface 78 coordinates "handshaking" between the parity memory 16 and the parity digit generator 18. More particularly, data line 29 passes parity blocks and/or data buffer memory blocks into and out of the parity memory 16. Control line 60 passes control signals to the parity memory 16 for coordinating the placement of the data in the parity memory 16.

Encoder 72 is responsible for generating the parity digits. In the preferred embodiment, the encoder 72 is a hard wires system which efficiently performs calculations necessary for determining the parity digits. Suitable systems may also be designed in software. In either form, software or hardware, the encoder 72 performs equivalent steps for calculating ECC the parity digits. The steps of calculation are depicted in flow diagrams in FIGS. 6, 12 and 14 (to be more fully discussed in Sections IV, V and VI).

MPU interface 70 coordinates all "handshaking" between the microprocessor unit 10 and the parity digit generator 18. Data over the low speed data bus 28 is received by the MPU interface 70 over data line 34. Control signals from the microprocessor unit 10 are received by the MPU interface 70 by control line 62. The MPU interface 70 also informs the microprocessor unit 10 of the activity of the parity digit generator 18 by providing status data over the data line 34.

The multiplexer (MUX) 76 coordinates the flow of data into the encoder 72. More particularly, encoder 72 can perform encoding on previously stored data in the parity memory 16 or on incoming data immediately from DMA interface 74. The purpose of multiplexer 76 in for arbitrating which data line 88 or 86 is gated to the encoder 72.

Referring to FIGS. 1, 2 and 3, a more detailed description regarding the operation of the various components within the parity digit generator 18 is now discussed. Assume for purposes of this discussion that the data is presently being transferred over the high-speed bus 40, 44 (FIG. 1) from the buffer memory 24 (FIG. 1) to the tape formatter 20 (FIG. 1). As the data is being transferred, the parity digit generator 18 receives data in parallel over the high speed bus 40, 44. Depending on the particular method performed by encoder 72 (to be discussed in Section IV, V and VI), the DMA interface 74 will either send data directly to the encoder 72 or to the parity memory interface 78. If the data cannot be processed immediately by the encoder 72, data will be sent by data line 90 to the parity memory interface and then over data bus 29 to the parity memory 16 where it resides until it can be processed by encoder 72. If the data can be processed immediately from the DMA interface, it is sent over data line 86 to the multiplexer 76 and then to the encoder 72. Regardless of which path data bytes are sent, after encoding at encoder 72 the parity digits are sent over data line 82 to the parity memory interface 78 and then to the parity memory 16 for storage.

Figure 7:
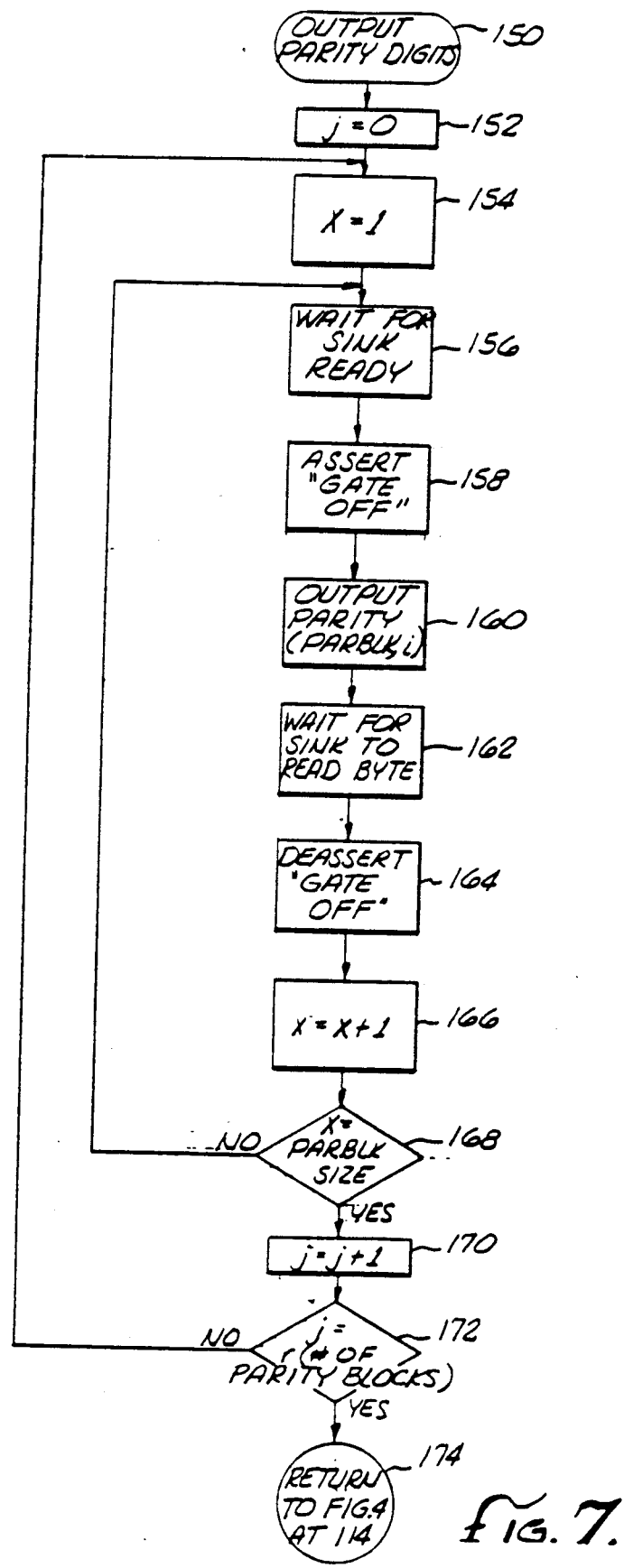
FIG. 7 is a flow diagram which depicts the sequence of operations performed by the DMA interface of the parity digit generator of FIG. 2 for outputting the parity digits under control of the OUTPUT PARITY DIGITS method referenced in FIG. 6.

Assuming that all of the parity digits have been calculated for a particular data interval, the microprocessor unit 10 will inform the parity digit generator 18 by control line 62 that the parity digits can now be output to the tape formatter 20 (FIG. 1). When tape formatter 20 (FIG. 1) requests the next block of data over the control line 56 (FIG. 1), the buffer manager 22 (FIG. 1) instructs the buffer memory 24 to send the next block of data to the tape formatter 20 (FIG. 1). An acknowledge signal (DACK) is sent over the control line 56 to the tape formatter 20 and to the parity digit generator 18 over control line 66 (FIG. 2). The parity digit generator via the DMA interface 74 then sends a "gate off" control signal over the control line 64 to the buffer memory 24. The parity memory interface 78 then locates the parity block(s) stored in the parity memory 16 corresponding to the previously processed data interval. The first parity block is sent over data line 29 to the parity memory interface 78, over data line 90 to the DMA interface 74 over high speed bus 44 (FIG. 1) and then to the tape formatter 20. This process will occur "r" times, depending on the level of redundancy employed by the system. Tape formatter 20 assembles the parity block into the format shown in FIG. 3 and then sends the parity block over line 46 to the data sink 13. The steps performed by the DMA interface 74 to output the parity block from the parity digit generator 18 are shown in FIG. 7 (to be discussed in Section IV).

IV. Generate ECC Method

Figure 4:
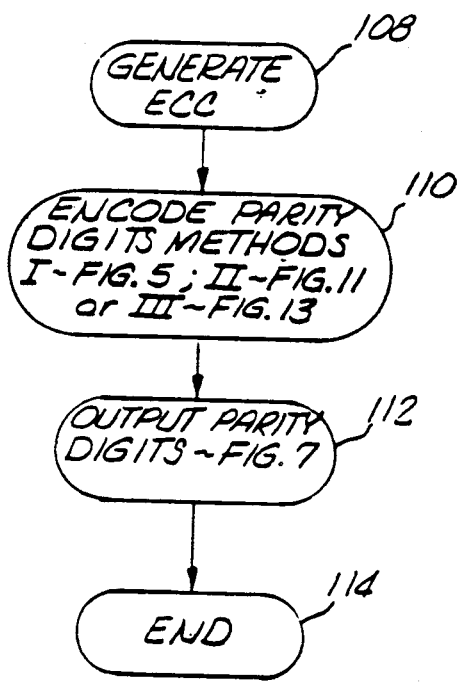
FIG. 4 is a flow diagram which depicts the sequence of operations of the parity digit generator of FIG. 2 under control of the GENERATE ECC method.

FIG. 4 is a flow diagram of the GENERATE ECC method performed by the parity digit generator 18 (FIG. 2) for encoding parity digits and for outputting the parity digits to the tape formatter 20 (FIG. 2).

Figure 13:
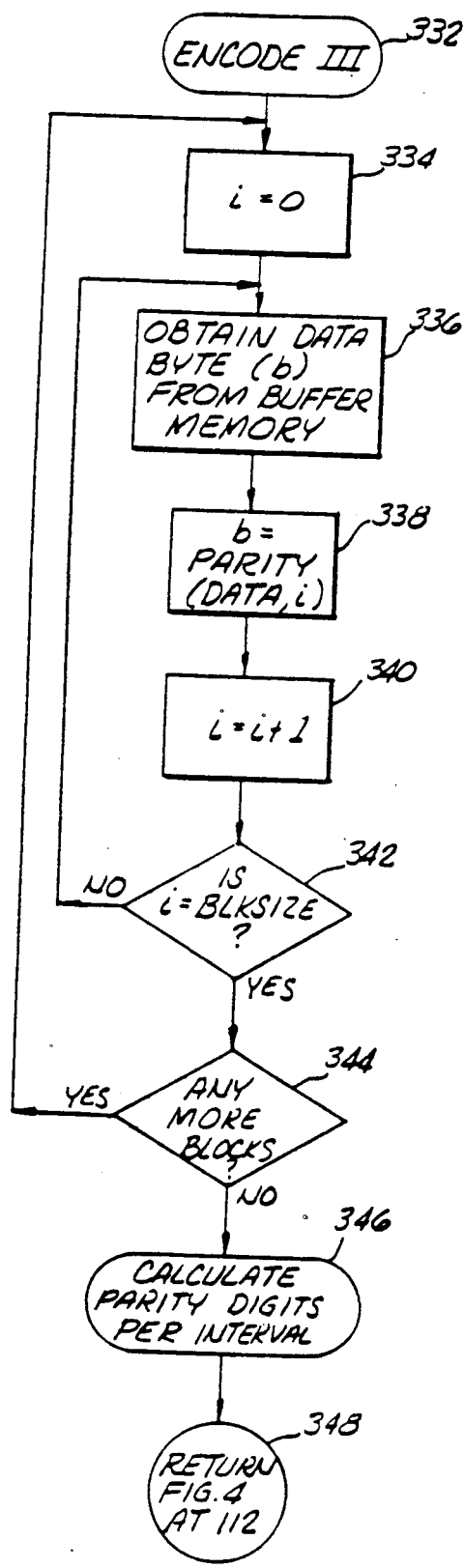
FIG. 13 is a flow diagram which depicts the sequence of operations performed by the components of the parity digit generator (FIG. 2) for encoding a data interval under control of the ENCODE PARITY DIGITS method III referenced in FIG. 4.

More particularly, during block 110 of FIG. 4, one of three ENCODE PARITY DIGITS methods I (FIG. 5), II (FIG. 11) or III (FIG. 13) is called. The first PARITY DIGITS ENCODE method I (FIG. 5) calculates parity digit after each byte of data is processed by the parity digit generator 18 (FIG. 2). The second method, ENCODE PARITY DIGITS method II (FIG. 11) calculates parity digits after each block of data is processed by the parity digit generator 18 (FIG. 2). The third method, ENCODE PARITY DIGIT method III (FIG. 13) encodes parity digits after an entire data interval 92 (FIG. 5) is processed by the parity digit generator (FIG. 2). Any one of the three encode methods may be performed by the encoder 72 to calculate the parity digits of the incoming data stream. The difference in the three methods is in the time frame in which the parity digits are calculated. The ENCODE PARITY DIGIT method I (FIG. 5) calculates the parity digits on an ongoing basis whereas, the ENCODE PARITY DIGIT method II (FIG. 11) and the ENCODE PARITY DIGIT method III (FIG. 13) calculates parity digits after a particular segment of data is processed; a block of data by the ENCODE PARITY DIGIT method II (FIG. 11) and a data interval by the ENCODE PARITY DIGIT method III (FIG. 13). A more detailed discussion on these methods is in discussed Sections VI and VII.

During block 112, DMA interface 74 (FIG. 2) performs the Output Parity Digits method (FIG. 2) for providing the necessary sequence of control signals, including gating signal, for outputting the calculated parity digits stored in the parity memory 16 (FIG. 2). Once the parity digits are output from the parity digit generator 18, processing ends at block 114.

A. Encode Parity Digits Method I

Figure 5:
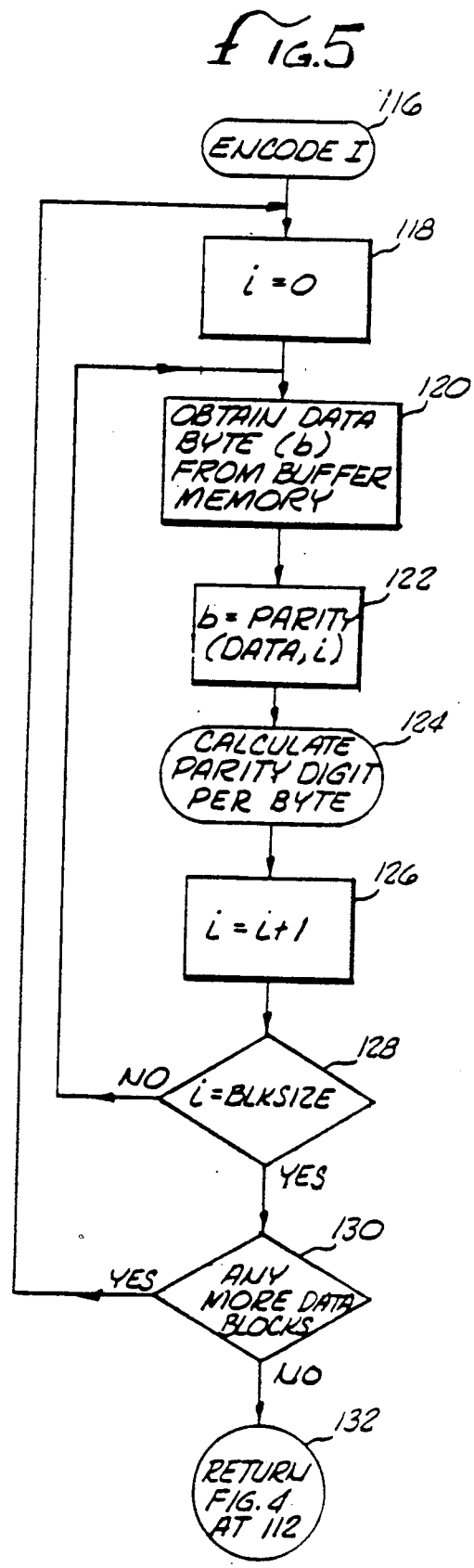
FIG. 5 is a flow diagram which depicts the sequence of operations performed by various components of the parity digit generator of FIG. 2 for calculating parity digits under control of the ENCODE PARITY DIGIT method I referenced in FIG. 4.

FIG. 5 is a detailed flow diagram of the ENCODE PARITY DIGITS method I. As stated above, the purpose of this method is for encoding an entire data interval by calculating parity digits after each byte of data is entered into the parity digit generator 18 (FIG. 2). More particularly, referring to FIG. 5 during block 118, a data byte index "i" is set to zero. The data byte index is used for keeping track of which byte of incoming data is currently being processed. Then, during block 120, DMA interface 74 of the parity bit generator 18 (FIG. 2) obtains a byte of data from the buffer memory 24 (FIG. 1) over the high speed bus 44. Once the data byte is input into the parity digit generator 18, the parity memory interface 78 assigns the data byte a location in the parity memory 16 parity (data, i) and stores the data in the parity memory 16 at the location, during block 122. Then, during block 124, the CALCULATE PARITY DIGIT (PER BYTE) method (FIG. 6) is called for calculating one or more parity digits (to be discussed more fully).

During block 126, data byte index i is incremented by 1 and then during block 128 the data byte index i is compared with the variable block size "BLKSIZE" to determine if i is equal to the block size—the number of data bytes in a particular block of data. Assuming that the data byte index i is not equal to BLKSIZE, then blocks 120, 122, 124, 126 and 128 are performed until all of the data bytes within the currently processed data block are processed. Once the data byte index i is equal to BLKSIZE, then processing continues at block 130. During block 130, the parity digit generator 18 determines if there are any more data blocks in the current data interval to be processed. Assuming that there are still more data blocks in the current data interval to be processed by the parity digit generator 18, then processing continues at blocks 120, 122, 124, 126, 128 and 130 until all of the data bytes of all of the data blocks within a particular data interval are processed. Once encoding is completed for a particular data interval, processing continues at block 132. During block 132, processing returns to the calling program, GENERATE ECC method (FIG. 4) at block 112.

Before discussing the process for calculating parity digits, a brief background on generating ECC is now discussed. In the general class of codes known as the Bose-Chaudhuri-Hocquenghem codes (BCH codes), information bytes are represented as elements of a Galois field. The particular representation is dependent on a primitive polynomial chosen to define the field. A detailed description on primitive polynomials and the correspondence between data and its Galois field representation may be found in Chapter 6 of "Error Correcting Codes" by Peterson and Welden, published by MIT Press, which is incorporated herein by reference.

Data is typically organized as a block wherein each block is chosen to include a fixed number of data bytes. The data block may be represented as a polynomial of the form:

$$DATA = L_0 * X^{R+M-1} + L_1 * X^{N+M-2} + L_2 * X^{N+M-3} + \ldots L_{N-2} * X^{R+1} + L_{N-1} * X^R$$

where $L_0$ through $L_{R-1}$ are data bytes in the data block, M is the number of data bytes in a data block, X is any element of the chosen Galois field, and N is the number of factors in the generator polynomial (to be discussed below).

After the primitive polynomial has been generated, the second step of the encoding process consists of dividing the polynomial by a generator polynomial. In the BCH codes, the general form of this polynomial is:

$$G(X) = (X - \alpha^a)(X - \alpha^b) \ldots *(X - \alpha^R)$$

where [$\alpha$] is a primitive element which is a root of the primitive polynomial discussed previously and the exponents are chosen to create desired properties of a particular ECC code. X, as before, is any element of the Galois field. The choice of a particular o basis follows from the independent choices of an irreducible polynomial of the field and the choice of primitive elements from which the generator polynomial is subsequently constructed. For a discussion of the criteria for these choices in relation to error correcting properties of the resulting codes, the reader is strongly urged to consult a standard reference as for example Berlekamp, "Algebraic Coding Theory", McGraw Hill, 1968, which is herein incorporated by reference. The number of different bases is given by a formula involving the Moebious function, see Chapter 3, "Algebraic Coding Theory" for detailed discussion of this subject matter. In the particular class of BCH codes known as Reed-Solomon codes, the exponents of the primitive elements [$\alpha$] are restricted to consecutive whole numbers beginning with zero.

Referring to FIG. 9(A) an example of a finite field polynomial division is shown. The generator polynomial 178 is divided into the primitive or data polynomial 176 to obtain a quotient polynomial 180. A single division 184 of the generator polynomial into the data polynomial creates a quotient 186 plus two remainder or parity digits 188. The number of factors in the generator polynomial 178 determines the number of parity digits calculated. Division of the data polynomial by the generator polynomial may be repeated a number of times to create additional parity digits as shown in FIG. 9(A). The advantage of this method is to allow a more complete correction code to be formulated of any errors that might have occurred during transmission. In the preferred embodiment which incorporates a highly interleaved Reed-Solomon code, this division is carried out R times.

Figure 6:
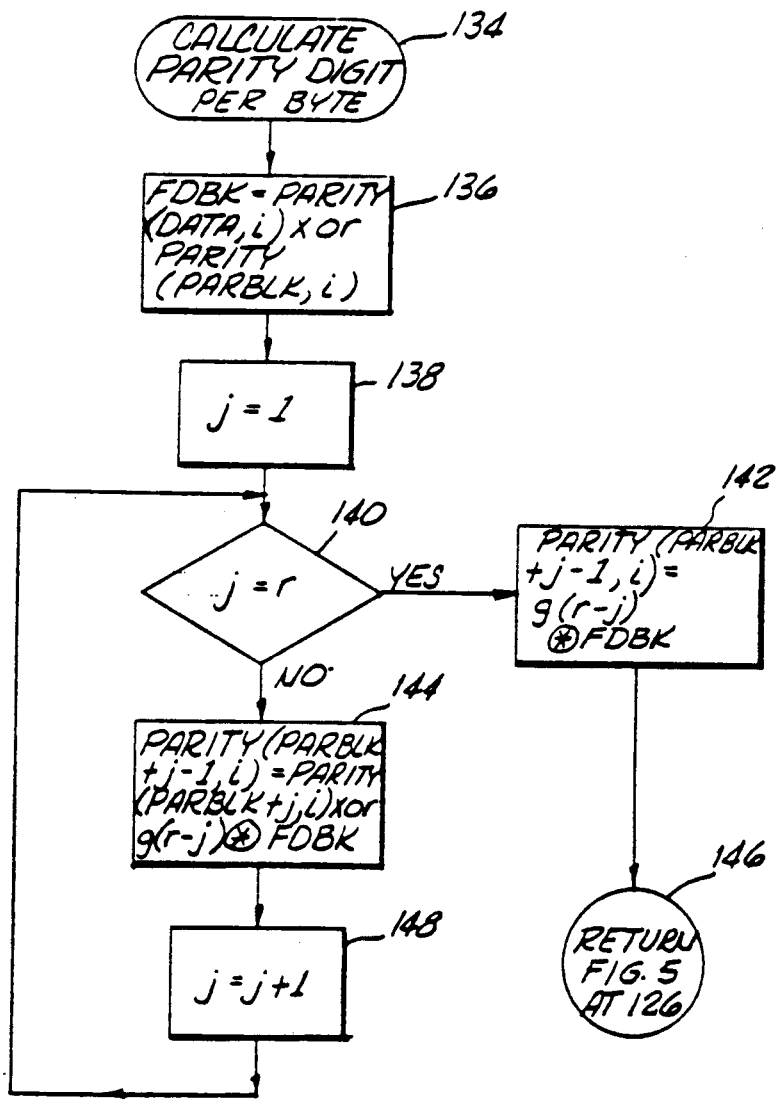
FIG. 6 is a flow diagram which depicts a sequence of operations performed by the encoder of the parity digit generator of FIG. 2 for calculating parity digits under control of the CALCULATE PARITY DIGIT (PER BYTE) method referenced in FIG. 5.
Figure 14:
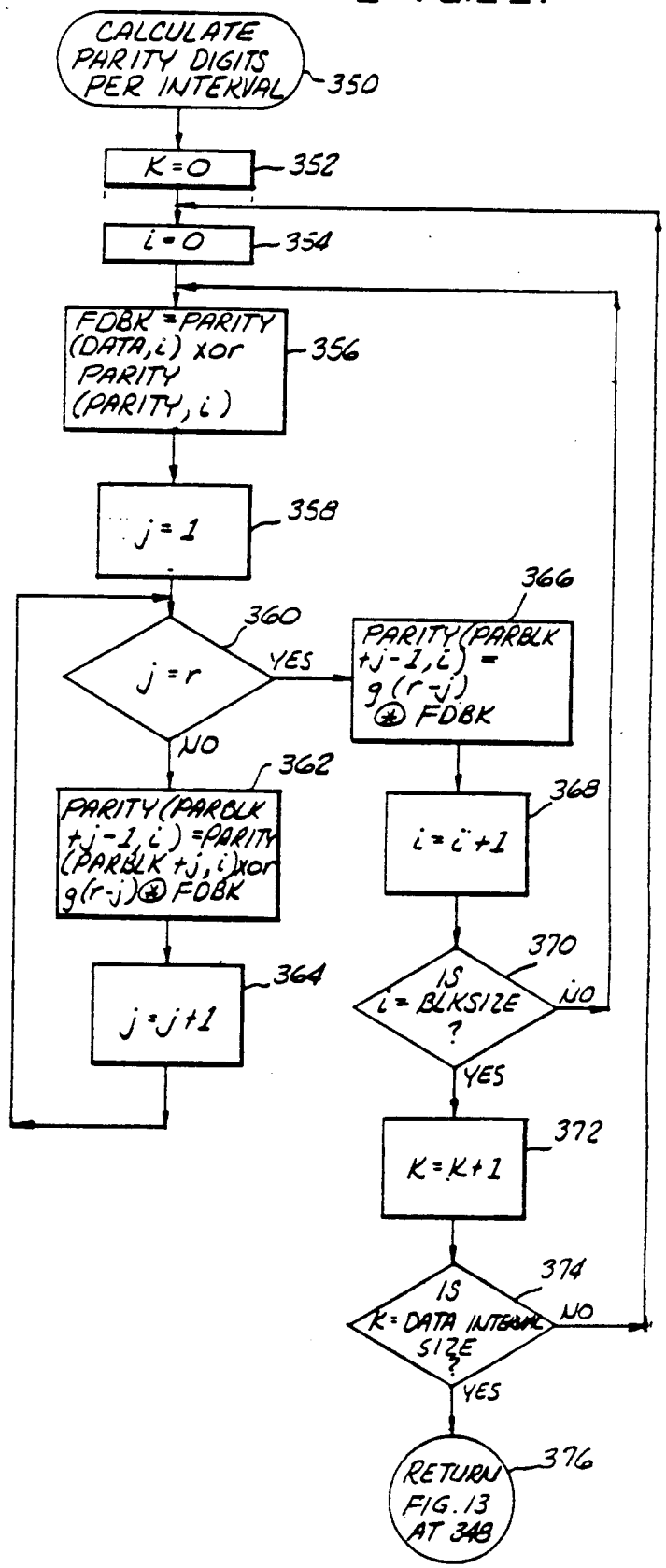
FIG. 14 is a flow block diagram which depicts the sequence of operations of the encoder of the parity digit generator (FIG. 2) for calculating parity digits for an entire data interval under control of the CALCULATE PARITY DIGIT (PER INTERVAL) method referenced in FIG. 13.

Because the polynomial division shown in FIG. 9(A) cannot be efficiently performed by a program within the computer, a method for performing the polynomial division has been devised as shown in FIG. 9(B). This method is more fully discussed by Berlekamp in "Algebraic Coding Theory," published by Aegean Park Press, 1984, which is herein incorporated by reference. The method for calculating the parity digits for each data byte using the strategy as shown in FIG. 9(B) is also incorporated into the CALCULATE PARITY DIGIT methods (FIGS. 6, 12 and 14).

A detailed discussion of the CALCULATE PARITY DIGIT method (FIG. 6) is now discussed. Referring to block 136 of FIG. 6, a variable for feedback ("FDBK") is set equal to the incoming data byte at parity(data, i) and XORed with previously calculated parity digit represented at parity(PARBLK, i). The notation parity(PARBLK, i) represents an index into the parity memory 16 to the previously stored parity blocks. The parity memory 16 is initialized to zero, and thus at the beginning of the method the value for parity(PARBLK, i) is set to zero. During block 138, a parity digit block index "j" for counting the number parity blocks calculated is set equal to 1. In block 140, the parity block index "j" is checked to determine if it is equal to the redundancy variable "r"; the number of parity blocks to be generated. Assuming that j is not equal to r, processing continues at block 144.

During block 144, encoder 72 calculates the equation:

Parity(PARBLK+$j$−1, $i$) = Parity(PARBLK+$j$, $i$)
  XOR $g(r-j)$ *FDBK where parity(PARBLK+$j$−1, i) is the parity memory location of the $i^{th}$ parity digit in the $j$−1th parity block, parity(PARBLK+j, i) is equal to the $i^{th}$ parity digit associated with the $i^{th}$ data byte in the +$j^{th}$ parity digit block; g(r−j) is equal to the coefficient of the r−$j^{th}$ element of the generator polynomial, and, FDBK is equal to the feedback variable determined during block 136 above. The operations XOR (i.e. field addition) and multiplication "*" are depicted as finite field GF(4) operations in FIGS. 8(A) and 8(B), respectively. For a more detailed discussion regarding the derivation and use of these tables, please refer to "Bit-Serial Reed-Solomon Decoders in VLSI" by Douglas Whiting, published by California Institute of Technology—5157:TR:84 (1984) which is herein incorporated by reference and to "Algebriaic Coding Theory" by Berlekemp reference earlier. The Galois field table for addition (i.e. XOR) is shown for a finite field having four digits "0123." Additionally, the multiplication is also shown for a finite field having four digits "0123."

Processing continues at block 148, during which the parity block index j is incremented by 1. Then, during block 140, the parity block index j is compared with the redundancy variable r to determine if they are equal. Assuming that j is equal to r, processing continues at block 142, during which the last parity digit to be calculated for the currently processed byte of data is determined by the equation:

parity(PARBLK+$j$−1, $i$) = $g(r-j)$ * FDBK where the variables referenced have been described above. During block 146, processing returns to FIG. 5 at block 126. A more detailed discussion regarding calculation of parity digits will be discussed with reference to the results table in FIGS. 10(A), (B) and (C).

B. Output Parity Digits Method

Referring to FIG. 7, a detailed discussion of the OUTPUT PARITY DIGITS METHOD is now discussed. As stated earlier, the purpose of this method is for controlling the transfer of parity digits from the parity digit generator 18 to the tape formatter 20. More particularly, referring to block 152, the variable j for counting the number of parity digit blocks output from the parity digit generator 18 is set equal to zero. Then, during block 152, an index x for counting the number of parity digits is set equal to zero. During block 156, DMA interface 74, (FIG. 2) waits for a control signal from the tape formatter 20 indicating that data sink 13 is ready for data. When the DMA interface receives the acknowledge signal (DACK) over control line 66 from the buffer manager 22, the DMA interface sends a "gate off" control signal over control line 64 to the buffer memory 24. The "gate off" signal effectively halts the output operation to buffer memory 42. Then, during block 160, the parity memory interface 78 obtains the parity byte located at parity(PARBLK, i) in the parity memory 16 and transfers the byte over data line 29 to the DMA interface 74. The DMA interface then outputs the parity byte to the tape formatter 20. During block 162, the DMA interface waits for an acknowledge signal from the tape formatter 20 indicating that the tape formatter 20 has read the parity byte During block 164, the "gate off" control signal is deasserted which effectively releases control and enables the buffer memory to operate normally. Specifically, the "gate off" signal is deasserted during block 164 in order to allow access to the high speed data bus 44 by the buffer memory and the host interface 14. Then, during block 166, the index x is incremented by 1. In block 168, x is compared to PARBLKSIZE, the number of parity digits in a block. Assuming that x is not equal to the parity BLKSIZE, then processing continues at blocks 156, 158, 160, 162, 164, 166 and 168 until all of the parity bytes in a particular parity block have been output.

If x is equal to PARBLKSIZE, then processing continues in block 170. During block 170, the parity block index j is incremented by 1. In block 172, the parity block index j is compared to the redundancy variable r which indicates the number of parity blocks to be output. Assuming that x is not equal to r, processing continues at blocks 154, 156, 158, 160, 162, 164, 166, 168, 170, 172, until all the parity bytes of all of all of the parity blocks have been output to the tape formatter 20. Once all of the parity blocks have been output, then x will equal r and processing will continue at block 174. During block 174, processing returns to the GENERATE ECC method (FIG. 4) at block 114 Processing ends during block 114.

V. Detailed Example of the GENERATE ECC Method

Referring to FIGS. 4, 5, 6, 7, 8(A) and (B), 9(A), (B), (C) and (D), and 10(A), (B) and (C), a detailed description of an example of how the parity digit generator 18 generates ECC is now discussed. For purposes of this example, assume that data in the form shown in FIG. 9(C), is presently being transferred over the high speed bus 44 from the buffer memory 24 (FIG. 1) to the tape formatter 20 (FIG. 1). Each input data block 215, 217, 219, 221, 223 (FIG. 9(C)) in the input data interval, contains only one byte of data as shown. Typically, each block of data will contain M data bytes as shown in FIG. 3, however, for purposes of keeping the detailed example to a minimum discussion, only one data byte has been included in each data block. Collectively, the data bytes create a column of data "2 3 0 1 1." For purposes of this example, the redundancy level or the number of parity blocks to be generated by the parity digit generator 18 will be two and thus, r is set equal to 2. Once the parity blocks have been calculated, the entire column of data plus the resulting parity digits will constitute a single Reed-Solomon code word 227 (FIG. 9(C)). The parity blocks are shown at 225, FIG. 9(D).

A results table depicting the various stages for calculating the parity digits for the Reed-Solomon code word 229 (FIG. 9(D))is shown in FIGS. 10(A), (B) and (C). Each column of the results table represents a particular variable and each row of the results table depicts a change in the variable during processing of the ENCODE PARITY DIGITS method I (FIG. 5) and the CALCULATE PARITY DIGIT (PER BYTE) method (FIG. 6). From left to right in the results, table FIGS. 10(A), (B) and (C), the first column represents a data byte variable ("b") for representing a data byte of the incoming data stream; the second column represents the feedback variable ("FDBK") used in calculating a parity digit, the third column represents the parity digit block index ("j") for keeping track of the quantity of parity blocks assembled; the fourth column represents an element $g(r-j)$ of the generator polynomial, the fifth column represents a calculated parity digit "parity(PARBLK+j−1, i)", the sixth column represents a second element $g(r-j+1)$ of the generator polynomial, and the last column represents a second parity digit ("parity(PARBLK+j, i"). Because the redundancy variable r is set equal to 2, two parity digits p(0, i) and p(1, i) are generated in this example. The preferred embodiment has the capability of changing r to generate additional parity digits depending on the level of error correcting capability desired.

Now referring to FIG. 4, the parity digit generator 18 performs the GENERATE ECC method (FIG. 4) to calculate two parity digits (225, 227 FIG. 9(D)) associated with the input data column 227 as shown in FIG. 9(C). During block 110, the parity digit generator 18 performs the ENCODE PARITY DIGIT method I (FIG. 5). Referring to FIG. 5 at block 118, the data byte index i for the first input data block is set equal to zero. Variable BLKSIZE has been preset to 1 indicating that the number of bytes in a block is 1. Then, during block 120, the DMA interface 74 obtains the first data byte of incoming data from the buffer memory 24 (FIG. 1). The first data byte of incoming data is "2" (215, 227, FIG. 9(C)). During block 122, variable parity(data, i), a location in parity memory is set equal to the incoming data value "2" (214, FIG. 10(A)). Next, the CALCULATE PARITY DIGIT (PER BYTE) method (FIG. 6) is called at block 124.

Referring to FIG. 6, during block 136 of the CALCULATE PARITY DIGIT (PER BYTE) method, the feedback variable "FDBK" is determined. More particularly, the formula:

FDBK = parity(data, i) XOR parity (PARBLK, i)

is calculated. The value for parity(data, i) or parity(2,0) is equal to 2 and the value for parity(PARBLK, i) is equal to 0 because the parity memory 16 (FIG. 2) has been previously initialized to zero. Thus, the equation for FDBK reduces to 2 XOR 0, which according to the GF(4) XOR table (FIG. 8(A)) is 2 (216, FIG. 10(A)). Then, during block 138, the parity digit block index variable j is set equal to 1 (218, FIG. 10(A)). During block 140, the variable j is compared to the redundancy variable r to determine if they are equal. The variable j is presently equal to 1 (218, FIG. 10(A)) and r has been preset equal to 2. Thus, processing continues at block 144, during which the first parity digit p (0, 0) is determined from the formula:

$$p(0, 0) = \text{parity}(\text{PARBLK} + j - 1, i) = \text{parity}(\text{PARBLK} + j, i) \text{ XOR } g(r-j) * \text{FDBK};$$

where parity(PARBLK+j, i) is initialized to 0, g(r−j) is equal to the g(1) element of the generator polynomial 178 (FIG. 9(A)), which is 2 (220, FIG. 10(A)) and FDBK has been previously determined to be 2 (216, FIG. 10(A)). Referring to the tables of FIGS. 8(A) and (B) the result of the equation 0 XOR 2 * 2 is 3 and there the value for the parity digit p(0, 0) is 3. (222, FIG. 10(A)).

During block 148, the parity block index j is incremented by 1 and processing continues at block 140. During block 140 the variable j is compared to the variable r. The variables j and r are now both equal to 2 and thus processing continues at block 142. During block 142, the p (1, 0) parity digit is determined by calculating the formula:

$$p(1, 0) = \text{parity}(\text{PARBLK} + j - 1, i) = g(r-j) * \text{FDBK},$$

Where g(r−j) is the g(0) term of the generator polynomial which is 3(226, FIG. 10(A)) and the FDBK variable is equal to 2. Thus, the equation reduces to 3*2 according to the table FIG. 8(B) is 1 (228, FIG. 10(A)). Thus, the p(1, 0) parity digit is equal to 1. Note that the remainder values at 186 and 188 (FIG. 9(B))of the polynomial division correspond to p(0, 0) (222, FIG. 10(A)) and p(1, 0) (228, FIG. 10(A)) which have been calculated for the first input data byte. Processing continues at block 146, during which processing returns to the ENCODE PARITY DIGITS method I (FIG. 5) at block 126.

Referring to FIG. 5, during block 126, the data byte index i is incremented by 1; i is now equal to 1. Then, during block 128, the parity digit generator 18 determines whether i is equal to BLKSIZE. Recall that BLKSIZE was previously set equal to 1 because there is only one data byte within each data block Thus, i is equal to BLKSIZE and processing continues to block 130. During block 130, the parity digit generator 18 determines that there are still more data blocks to be processed, and processing continues to block 118. During block 118, the data byte index i is reset equal to 0 and in block 120, the first data byte in the next data block (217, 227 FIG. 9(C)) is obtained from buffer memory 24. The data byte of the second data block has a value of 3 (217, 227, FIG. 9(C)). During block 122, the parity memory interface 78 assigns the value 3 a location in the parity memory 16; parity(data, i) where "data" is equal to "3" and "i" is equal to "0" or parity(3, 0). In block 124, the parity digit generator 18 calls the CALCULATE PARITY DIGIT (PER BYTE) method (FIG. 6) to calculate the parity digits associated with the currently processed data byte.

Referring to FIG. 6, during block 136, the variable FDBK is calculated from the formula:

$$\text{FDBK} = \text{parity}(\text{data}, i) \text{ XOR parity}(\text{PARBLK}, i),$$

where parity(data, i) is equal to 3 (232, FIG. 10(A)) and the value for parity(PARBLK, i) is equal to the value of the first parity digit calculated for the previously processed data byte, which was 3 (222, FIG. 10(A)). Thus, FDBK is equal to the equation 3 XOR 3 which is 0 (232, FIG. 10(A)). Then, during block 138, the parity block index j is set equal to 1 and during block 140 the variable j is compared with r. The variable j is equal to 1 and the variable r has been preset to 2, processing continues at block 144. During block 144, the value for the parity digit p(0, 0) is calculated by the formula:

$$p(0, 0) = \text{parity}(\text{PARBLK} + j, i) \text{ XOR } g(r-j) * \text{FDBK}$$

where parity(PAR+j, i) is parity(PARBLK+1, 0) or p(1, 0) which was the second previously calculated parity digit or 1 (228, FIG. 10(A)), g(r−j) is equal to g(2−1) or g(1) which is equal to 2 (236, FIG. 10(A)) and the variable FDBK is equal to zero (232, FIG. 10(A)) calculated during block 136. Thus, the parity digit p(0, 0) is equal to 1 for 2 * 0 which is 1 (238, FIG. 10). The new value of p(0, 0) effectively overwrites the first parity digit previously calculated and stored in parity memory at p(0, 0).

Processing continues at block 148, during which the parity block index j is incremented by 1 (240, FIG. 10(A)) and during block 140, encoder 72 determines that the variable j is equal to the variable r. Thus, processing continues to block 142, during which the next parity digit p(1, 0) for the current data value is determined to be 0 (244, FIG. 10(A)) from the calculation g(r−j) * FDBK, where g(r−j) is g(2−2) or g(0) which is 3 and FDBK is 0 (244, FIG. 10). Referring now to FIG. 9(B), the corresponding remainders are 190 and 192. Processing returns during block 142 to the ENCODE PARITY DIGIT method I (FIG. 5) at block 126.

During block 126, the data byte index i is incremented by 1 and then during block 128, the parity digit generator 18 determines that the data byte index i is equal to BLKSIZE. Processing continues at block 130, during which the parity digit generator 18 determines that there is still more data blocks that need to be processed.

Processing continues at block 118, during which the data byte index i is reset to zero Then, during block 120, the next data byte "0" (246, FIG. 10(A)) is obtained from the buffer memory 24. During block 122, the data byte value 0 is assigned a location in the parity memory 16 at parity(data, i) where data is equal to 3 and i is equal to 0 or parity(3, 0). Then, during block 124, the CALCULATE PARITY DIGIT method (FIG. 6) is called to calculate the parity digits associated with the current data byte.

During block 136, the variable FDBK is calculated to be 1 from the formula:

$$\text{FDBK} = \text{parity}(\text{data}, i) \text{ XOR parity}(\text{PARBLK}, i),$$

where parity(data, i) is equal to zero (246, FIG. 10(A)) and parity(PARBLK, i) or p(0, 0) is equal to 1 (238, FIG. 10). Processing continues at block 138, during which the parity block index j is set equal to 1. During block 140, the encoder 72 determines that j is not equal to r, and processing continues at block 144. In block 144, the first parity digit (p (0, 0)) is determined to be 2 (254, FIG. 10(A)) from the formula:

$$p(0, 0) = \text{parity}(PARBLK+j, i) \text{ XOR } g(r-j) * FDBK,$$

where parity(PARBLK+j, i) is equal to the previously calculated parity digit or 0 (244, FIG. 10(A)) currently stored at the parity memory location p(1, 0), g(r−j) is g(1) or 2 (252, FIG. 10(A)) and FDBK is equal to 1 (248, FIG. 10). Thus, the old p(0, 0) parity digit is over written with the newly calculated value 3 (254, FIG. 10(A)).

During block 148, the variable j is incremented by 1 (256, FIG. 10(A)) and during block 140 the encoder 72 determines that j is equal to r. Processing continues at block 142, during which the second parity digit p(1, 0) for the current data byte is calculated to be 3 (280, FIG. 10(B)) from the formula:

$$p(1, 0) = g(r-j) * FDBK,$$

where g(r−j) is g(0) or 3 (258, FIG. 10) and FDBK is equal to 1 (248, FIG. 10(A)). The old value stored at p(1, 0) ("0", (244, FIG. 10(A)) is over written by the new value for p(1, 0) or 3 (280, FIG. 10(B)). Processing returns at block 146 to the ENCODE PARITY DIGIT method I (FIG. 5) at block 126.

During block 126, the data byte index i is incremented by 1 and in block 128 i is determined to be equal to BLKSIZE Processing continues at block 130, during which the parity digit generator 18 determines that there are still more data blocks to be processed. Thus, processing continues at block 118, during which the variable i is reset to 0. During block 120, the next data byte "1" (221, 227 FIG. 9(C)), (262, FIG. 10(B)) is obtained from the buffer memory 24 and during block 122, the data byte is assigned a location in the parity memory 16 or parity(data, i) which is parity(1, 0). During block 124, the CALCULATE PARITY DIGIT (PER BYTE) method (FIG. 6) is called to calculate the parity digits associated with the current data byte "1".

Referring to FIG. 6, during block 136, the FDBK variable is calculated to be 3 (264, FIG. 10(B)) from the formula:

FDBK = parity(data, i) XOR parity(PARBLK, i), where parity(data, i) is equal to 1 (262, FIG. 10(B)) and parity(PARBLK, i) is equal to 2 (254, FIG. 10(A)); the previously calculated parity digit at p(0, 0). During block 138, the parity block index j is set equal to 1 (266, FIG. 10(B)) and during block 140, the encoder 72 determines that the variable j is not equal to the variable r. Processing continues at block 144, during which the first parity digit p(0, 0) is calculated to be 2 (270, FIG. 10(B)) from the formula: parity (PARBK+j−1, i) = parity(PARBLK+j, i) XOR g(r−j) * FDBK where parity(PARBLK+j, i) is equal to 3 (260, FIG. 10(A)), g(r−j) is g(1) or 2 (268, FIG. 10(B)) and FDBK is 3 (264, FIG. 10(B)).

During block 148, the parity digit index j is incremented by 1 (272 FIG. 10(B)) and during block 140, the encoder 72 determines that j is equal to r. Processing continues at block 142, during which the second parity digit p(1, 0) is calculated to be 2 (272, FIG. 10(B)) from the parity digit formula: parity(PARBLK+j−1, i) = g(r−j) * FDBK, where g(r−j) is g(0) or 3 (274, FIG. 10(B)) and the variable FDBK is equal to 3 (264, FIG. 10(B)). During block 146, processing returns to the ENCODE PARITY DIGIT method I (FIG. 5) at block 126.

Referring to FIG. 5, during block 126 the data byte index i is incremented by 1 and during block 128, encoder 72 determines that i is equal to BLKSIZE. Processing continues during block 130, during which the parity digit generator 18 determines that there is still one more block (223, FIG. 9(C)) to be processed. Then, during block 118, the data byte index i is set equal to 0. In block 120, the next data byte "1" (223, 227, FIG. 9(C)) is obtained from buffer memory 24 and during block 122 the current data byte is stored in the parity memory 16 at parity(data, i). During block 124, the CALCULATE PARITY DIGIT (PER BYTE) ROUTINE (FIG. 6) is called.

Referring to FIG. 6, during block 136, the VARIABLE FDBK is calculated to be 3 (280, FIG. 10(B)) from the formula:

FDBK = parity(data, i) XOR parity(PARBLK, i), where parity(data, i) or p(3, 0) is equal to 1 (278, FIG. 10(B)) and parity(PARBLK, i) or p(0, 0) is equal to 2 (270, FIG. 10(B)). During block 138, the parity block index j is set equal to 1 (282, FIG. 10(B)) and during block 140 j is determined not to be equal to r. Processing continues at block 144, during which the first parity digit p(0, 0) is calculated to be 3 (286, FIG. 10(B)) from the formula:

$$p(0, 0) = \text{parity}(PARBLK+j, 0) \text{ XOR } g(r-j) * FDBK,$$

where parity (PARBLK+j, 0) the previously calculated parity digit p(1, 0) is 2 (276, FIG. 10(B)), g(r−j) is g(1) or 2 (284, FIG. 10(B)) and FDBK is 3 (280, FIG. 10(B)). During block 148, the variable j is incremented by 1 (288, FIG. 10(B)) and during block 140, the encoder 72 determines that j is equal to r. Processing continues at block 142, during which the second parity digit p(1, 0) is calculated to be 2 (292, FIG. 10(C)) by the formula:

$$p(1, 0) = g(r-j) * FDBK,$$

where g(r−j) is g(0) or 3 (290, FIG. 10(C)) and FDBK is equal to 3 (280, FIG. 10(B)). At this time, the entire data interval "2 3 0 1 1" (227, FIG. 9C) has been processed by the parity generator 18 resulting with two stored parity digits, where p(0, 0) is 3 and p(1, 0) is 2. In other words, the polynomial division shown in FIG. 9(B) has been simulated and completed resulting in the Reed-Solomon code word as shown at 229 of FIG. 9(D). The resulting parity digits p(0,0) and p(1,0) associated with the data interval (FIG. 9C) are stored in the parity digit memory 16 until the OUTPUT PARITY DIGIT method (FIG. 6) is performed. In the meantime, processing returns during block 146 to the ENCODE PARITY DIGIT method I (FIG. 5) at block 126.

Referring to FIG. 5, during block 126, the data byte index i is incremented by 1 and in block 128, the parity digit generator determines that i is equal to BLKSIZE. Processing continues at block 130, during which the parity digit generator 18 determines that there are no more data blocks in the input data interval (FIG. 9C) to be processed. During block 132, processing returns to the GENERATE ECC method (FIG. 4) at block 112.

During block 112 (FIG. 4), the OUTPUT PARITY DIGITS method (FIG. 7) is called to output the stored parity blocks (225, FIG. 9(D)) associated with the currently processed data interval "230.1".

Referring to FIG. 7, the parity block index j is initialized to 0 during block 152. Then, during block 154, the parity digit index x is initialized to 1. In block 156, the DMA interface 74 (FIG. 2) monitors control line 56, (FIG. 2) via the control line 66, to determine if request signal (DREQ) for more information has been sent. Once the data request signal is sent from the tape formatter 20 (FIG. 1) and acknowledged by the buffer manager 22 (FIG. 1), the DMA interface 74 (FIG. 2) asserts a "gate off" signal over control line 64 (FIG. 2), during block 158. Then, during block 160, the first parity digit "3" (225, FIG. 9(D)) is obtained from the parity memory 16 (FIG. 2) from the p(0, 0) location (FIG. 2) and sent over data bus 29 to the parity memory interface 78 (FIG. 2) and then to the DMA interface 74 (FIG. 2) over data bus 90 (FIG. 2) where it is output over data bus 36 (FIG. 2) to the high speed bus 44 (FIG. 1). During block 162, the DMA interface 74 (FIG. 2) monitors the control bus 56 for a signal indicating that the parity byte has been read by the tape formatter 20, and then during block 164, the DMA interface 74 deasserts the a "gate off" signal over control line 64 to the buffer memory 24. During block 166, the parity digit index x is incremented by 1 and then during block 168, the parity digit generator 18 determines whether the parity digit x is equal to PARBLKSIZE, the size of the parity digit block. Because each parity digit block has only one byte PARBLKSIZE must be equal to 1 and therefore x is equal to PARBLKSIZE. Processing continues at block 170, during which the parity block index j is incremented by 1 and during block 172, j is determined not to be equal to r. Thus, processing continues at block 154.

During block 154, the variable x is reset to 1. Then, in block 156, the DMA interface 74 (FIG. 2) waits for the tape formatter 20 (FIG. 1) to request the next date block over control line 56. When the buffer manager 22 acknowledges the data request from the tape formatter 20 (FIG. 1), the DMA interface 74 (FIG. 2) asserts the "gate off" signal over control line 64, during block 158. At block 160, the next parity digit "2" (225, FIG. 9(D)) is obtained from the parity memory 16 at the p(1,0) location and output over data line 29 to the parity memory interface 78 (FIG. 2) and then over data bus 90 (FIG. 2) to the DMA interface 74 (FIG. 2) where it is output over data bus 36 (FIG. 2) to the high speed bus 44 (FIG. 1). During block 162, the DMA interface 74 (FIG. 2) awaits acknowledgement over the control line 56 (FIG. 1) that the tape formatter 20 (FIG. 1) has read the parity digit byte. During block 164, the DMA interface 74 (FIG. 2) deasserts the "gate off" signal and in block 166, the parity digit index x is incremented by 1. At block 168, the parity digit index x is determined to be equal to the PARBLKSIZE and thus, processing continues at block 170. During block 170, the parity block index j is incremented by 1 and during block 172, j is determined to be equal to r. Processing returns during block 174 to block 114 of the GENERATE ECC method (FIG. 4). During block 114, processing is completed for the GENERATE ECC method; parity digits have been calculated and output to the data sink. At this time, the entire Reed-Solomon code word as shown in column 227 of FIG. 9(C) has been completed and sent to the data sink 13.

VI. Additional Embodiments for Encoding Parity Digits

A. Encode Parity Digits Method II

Referring to FIG. 11, a detailed discussion regarding the ENCODE PARITY DIGITS method II and the CALCULATE PARITY DIGITS (PER BLOCK) method (FIG. 12) is now discussed. The purpose of these methods are for encoding parity digits after a block of data is processed instead of after each byte of data, as discussed in section IV.

More particularly, referring to FIG. 11 during block 296 the data byte index i is initialized to zero. Then, during block 298, the first byte of data from the buffer memory 24 (FIG. 1) is obtained and during block 300, the data byte is assigned a location in the parity memory 16 (FIG. 2). During block 302, the index i is incremented by 1 and in block 304, the parity digit generator 18 compares i with BLKSIZE. Assuming that i is not equal to the data block size, processing continues at blocks 298, 300, 302, and 304 until all of the data has been read and stored into parity memory 16 (FIG. 2).

Assuming that all of the data in a particular block has been input into the parity memory 16, the CALCULATE PARITY DIGITS (PER BLOCK) method (FIG. 12) is called during block 306. The purpose of this method is for calculating the parity digits for the entire block of data now stored in the parity memory 16 (FIG. 2). Assuming that the CALCULATE PARITY DIGITS (PER BLOCK) method (FIG. 12) produces the parity digits, processing continues at block 308, during which the parity digit generator 18 determines whether there are any more data blocks left for processing. Assuming that there are still data blocks that need to be processed, processing continues at blocks 296, 298, 300, 302, 304 and 306 until all of the data blocks in the currently processed data interval have been processed. Once this operation has been completed, processing returns to the GENERATE ECC method (FIG. 4 at block 112).

Referring to FIG. 12, a more detailed discussion of the CALCULATE PARITY DIGITS (PER BLOCK) method (FIG. 12) is now discussed. More particularly, during block 314, the variable FDBK is determined by the formula:

$$FDBK = parity(data, i) \text{ XOR } parity(PARBLK, i).$$

Then, during block 316, the parity block index j is initialized to 1. During block 318, the variable j is checked to determine if it is equal to the redundancy variable r. Assuming that j is not equal to r, processing continues at block 370. During block 370, the encoder 72 calculates the equation:

$$\text{parity}(PARBLK+j-1, i) = \text{parity}(PARBLK+j, i)\\ \text{XOR } g(r-j) * FDBK,$$

where the parity digit being calculated is equal to the $i^{th}$ parity digit of the $j-1^{th}$ data block; parity(PARBLK+j, i) is equal to the $i^{th}$ parity digit byte in the previously calculated $+j^{th}$ parity digit block; g(r−j) is equal to the value of the $r-j^{th}$ element of the generator polynomial; and FDBK is equal to the feedback variable determined during block 314 above. Processing continues at block 322, during which the parity digit block index j is incremented by 1. Then, during block 318, the variable j is compared with the variable r to determine if they are equal. Assuming that j is equal to r, processing continues at block 324, during which the last parity digit to be calculated for a particular data byte is determined by the equation:

$$\text{parity}(PARBLK+j-1, i) = g(r-j) * FDBK.$$

During block 322, the data byte index i is incremented by 1. Then, in block 328, the data byte index i is compared with the variable BLKSIZE. Assuming that i is not equal to BLKSIZE, processing continues at blocks 314, 316, 318, 320, 322, 324, 326 and 328 until all of the data bytes of the currently processed block have been processed. Assuming that all of the data bytes have been processed, processing returns during block 330 to the ENCODE PARITY DIGITS method II at block 308.

B. Encode Parity Digits Method III

Referring to FIG. 13 and FIG. 14, a detailed description of the ENCODE PARITY DIGITS method III and CALCULATE PARITY DIGITS (PER DATA INTERVAL) method are now discussed. The purpose of these methods is for encoding parity digits for an entire data interval after it is entered into the parity digit generator 18.

More particularly, referring to FIG. 13 at block 334, the data byte index i is initialized to 0 and in block 336, the first data byte is obtained from the buffer memory 24. Then, during block 338, the input data byte is assigned an address in parity memory 16 (FIG. 2) and stored at that location. At block 340, the data byte index i is incremented by 1 and during block 342, i is compared to BLKSIZE. Assuming that i is not equal to the BLKSIZE, then processing continues at blocks 336, 338 to 334 and 342 until all of the data bytes for a particular block have been input. Assuming that all of the data bytes for the currently processed data block have been input to the parity digit generator 18, processing continues at block 334 during which a determination is made of whether there are any more blocks to be processed. Assuming that there are still more blocks in the data interval to be processed, processing continues at blocks 334, 336, 338, 340, 342 and 344 until all of the data bytes in all of the data blocks of the currently processed data interval have been input to the parity digit generator. Then, during block 346, the CALCULATE PARITY DIGITS (PER DATA INTERVAL) method (FIG. 14) is called to calculate all of the parity digits for the entire data interval.

Referring to FIG. 14 at block 352, a data block index "k" is initialized to 0. Then, during block 354, the data byte index i is also initialized to 0. At block 356, the variable FDBK is calculated from the equation:

$$FDBK = \text{parity}(data, i) \text{ XOR parity}(PARBLK, i).$$

Then, during block 358, the parity block index j is initialized to 1. At block 360, a determination is made as to whether j is equal to the redundancy variable r. Assuming that j is not equal to r, processing continues at block 362 during which a parity digit, parity(PARBLK+j−1, i), is calculated from the formula:

$$\text{parity}(PARBLK+j-1, i) = \text{parity}(PARBLK+j, i) \text{ XOR } g(r-j) * FDBK.$$

During block 364, the parity block index i is incremented by 1, and during block 360, j is compared with r. Assuming that j is equal to r, processing continues at block 366 where the last parity digit, parity(PARBLK+j−1, i), is calculated from the formula:

$$\text{parity}(PARBLK+j-1, i) = g(r-j) * FDBK.$$

During block 368, the data byte index i is incremented by 1 and then during block 370, i is compared with BLKSIZE. Assuming that there are more data bytes to be processed; i is not equal to the BLKSIZE, processing continues at blocks 356, 358, 360, 362, 364, 366, 368 and 370 until all of the data bytes of the particular block being analyzed are processed. When i is equal to BLKSIZE, processing continues at block 372, during which the variable k is incremented by 1. Recall that k signifies the count of the data blocks processed and during block 370 and it is compared with the number of blocks in the data interval, during block 328. Assuming that there are more blocks to be processed in the data interval, processing continues at blocks 354, 356, 358, 360, 362, 364, 366., 368, 370, 372 and 374 until all of the parity digits associated with all of the data byte(s) for all of the data blocks in the data interval are generated. Then during block 376, processing returns to the ENCODE PARITY DIGIT method III at block 348, which returns processing to the GENERATE ECC method (FIG. 4).

This invention has been described in an exemplary and preferred embodiment, but it is not limited thereto. Those skilled in the art will recognize that a number of additional modifications and improvements can be made to the invention without departure from the essential spirit and scope. For example, a number of software and hardware design methodologies and architectures in any number of different software languages would be suitable for implementing the disclosed invention.

We claim:

1. A method for generating parity digits of digital information (data) in a digital communication system, said communication system for transferring a plurality of intervals of said data from an originating data source to a data sink, each said data interval comprising one or more blocks of said data and each said block comprising one or more bytes of said data, said communication system including a data transfer bus for transferring said data intervals to and from said data source to and from a temporary storage means for holding said data intervals for a limited period, said temporary memory means located between said data source and said data sink, and said data transfer bus for transferring said data to and from said temporary storage means to and from said data sink, said method comprising the steps of:

transferring one or more of said data intervals from said data source to said temporary storage means over said data transfer bus and storing said one or more data intervals in said temporary storage means, transferring one of said data intervals from said temporary storage means to said data sink over said data transfer bus, during said transfer of said data interval to said data sink, calculating said parity digits associated with said data interval and storing said parity digits for further processing, gating said data transfer bus to halt any further transfers of said data intervals between said temporary storage means and said data sink, and during said gating, sending said stored parity digits over said data transfer bus to said data sink.

2. The method of claim 1 wherein said data interval comprises one or more columns and each said data interval column comprising one or more bytes of said data and each said byte being from a different block of said data interval, whereby each said data interval column and said associated parity digits form an error correction code word.

3. The method of claim 2 wherein said step for calculating said parity digits further includes the step of calculating said parity digits for each column of said data interval.

4. The method of claim 3, wherein said step of calculating further includes the step of calculating an intermediate resultant parity digit for each said byte of data after said byte of data is transferred to said data sink.

5. The method of claim 3 wherein said step of calculating further includes the step of calculating one or more intermediate resultant parity digits for each said block of data after said block of data is transferred to said data sink.

6. The method of claim 3 wherein said step of calculating further includes the step of calculating a plurality of parity digits for said data interval after said data interval is transferred to said data sink.

7. The method of claim 1 wherein said step of sending said stored parity digits to said data sink is operative only after said step of transferring said data to said data sink.

8. The method of claim 1 wherein said step for calculating said parity digits associated with said data interval further includes the steps of:

generating one or more finite field tables for efficiently performing finite field arithmatic operations, storing said one or more finite field tables in said temporary storage means, and referencing said stored finite field tables for calculating said parity digits associated with said data interval.

9. An apparatus for generating parity digits of digital information (data) in a digital communication system, said communication system for transferring a plurality of intervals of said data from an originating data source to a data sink, each said data interval comprising one or more blocks of said data and each said block comprising one or more bytes of said data, said communication system including a temporary storage means for holding said data intervals for a limited period and said temporary memory means located between said data source and said data sink, said apparatus comprising:

transfer bus means for transferring one or more of said data intervals from said data source to said temporary storage means and said transfer bus means for transferring said data intervals from said temporary storage means to said data sink, said transfer bus means coupled to means for calculating said parity digits associated with said data intervals, said means for calculating operative concurrently with said transfer of said data intervals to said data sink and said calculating means coupled to means for storing said parity digits for further processing, gating means for halting any further transfers of said data intervals between said temporary storage means and said data sink, and means for sending said stored parity digits over said means for transferring said data interval to said data sink.

10. The apparatus of claim 9 wherein said data interval comprises one or more columns and each said data interval column comprises one or more bytes of said data and each said byte being from a different block of said data interval whereby each said data interval column and said associated parity digits form an error correction code word.

11. The apparatus of claim 10 wherein said means for calculating said parity digits further includes means for calculating said parity digits for each column of said data interval.

12. The apparatus of claim 11 wherein said means for calculating further includes means for calculating an intermediate resultant parity digit for each said byte of data after each said byte of data is transferred to said data sink.

13. The apparatus of claim 11 wherein said means for calculating further includes means for calculating one or more intermediate resultant parity digits for each said block of data after each said block of data is transferred to said data sink.

14. The method of claim 11 wherein said means for calculating further includes means for calculating a plurality of parity digits for said data interval after said data interval is transferred to said data sink.

15. The method of claim 9 wherein said means for sending said stored parity digits to said data sink is operative only after said means for transferring said data to said data sink.

16. The apparatus of claim 9 wherein said means for calculating said parity digits associated with said data interval further includes:

means for generating one or more finite field tables for efficiently performing finite field arithmatic operations, means for storing said one or more finite field tables in said temporary storage means, and means for referencing said stored finite field tables for calculating said parity digits associated with said data interval.

17. A method for providing error correcting code words to a digital communication system, said digital communication system for transferring digital information from an originating data source to a data sink, said digital communication system including a data transfer bus for transferring said digital information from said data source to said data sink, said method comprising the steps of:

transferring said digital information from said data source to said data sink, during said transfer of said digital information, simultaneously calculating said error correcting code words associated with said transferred digital information, after said calculation of said error correcting code words, and while said transfer of digital information occurs temporarily storing only said error correcting code words for further processing, temporarily gating said data transfer bus of said digital communication system for halting further transfers of said digital information between said data source and data sink, and sending only said stored error correcting code words associated with said transferred digital information to said data sink after gating said further transfers of said digital information.

18. An apparatus for providing error correcting code words to a digital communication system, said digital communication system for transferring digital information from an originating data source to a data sink, said digital communication system including a data transfer bus for transferring said digital information from said data source to said data sink, said apparatus comprising:

means for calculating said error correcting code words associated with said transferred digital information, said means for calculating operative concurrently with said transfer of said digital information over said data transfer bus to said data sink, means for temporarily storing said error correcting code words for further processing, means for temporarily gating said data transfer bus of said digital communication system, said gating means for halting further transfers of said digital information between said data source and said data sink, operative when said gating means halts transfer of said digital information over said data transfer bus, means for sending only said error correcting code words associated with said transferred digital information data from said means of temporarily storing means to said data sink over said data transfer bus.

* * * * *

UNITED STATES PATENT AND TRADEMARK OFFICE
CERTIFICATE OF CORRECTION

PATENT NO.   :   4,996,690
DATED        :   February 26, 1991
INVENTOR(S)  :   Glen A. George, et al It is certified that error appears in the above-identified patent and that said Letters Patent is hereby corrected as shown below:

Col. 11, line 37, cancel "o" and insert -- $\alpha$ --

Col. 13, line 23, cancel "42" and insert -- 24 --

Col. 17, line 36, after "BLKSIZE" add -- . --

Signed and Sealed this

First Day of June, 1993

Attest:

MICHAEL K. KIRK

Attesting Officer         Acting Commissioner of Patents and Trademarks